(12) United States Patent
Bao et al.

(10) Patent No.: US 12,191,800 B2
(45) Date of Patent: Jan. 7, 2025

(54) AUTOMATIC SOLAR TRACKING PHOTOVOLTAIC POWER GENERATION DEVICE

(71) Applicants: Suzhou University of Science and Technology, Suzhou (CN); Suzhou Vacational University, Suzhou (CN)

(72) Inventors: Siyuan Bao, Suzhou (CN); Yongkang Zhang, Suzhou (CN); Yun Zhong, Suzhou (CN)

(73) Assignees: Suzhou University of Science and Technology, Suzhou (CN); Suzhou Vacational University, Suzhou (CN)

( * ) Notice: Subject to any disclaimer, the term of this patent is extended or adjusted under 35 U.S.C. 154(b) by 0 days.

(21) Appl. No.: 18/597,962

(22) Filed: Mar. 7, 2024

(65) Prior Publication Data
US 2024/0305240 A1    Sep. 12, 2024

(30) Foreign Application Priority Data
Mar. 7, 2023 (CN) .......................... 202310211358.8

(51) Int. Cl.
*H02S 20/32* (2014.01)
(52) U.S. Cl.
CPC .................... *H02S 20/32* (2014.12)
(58) Field of Classification Search
None
See application file for complete search history.

(56) References Cited

U.S. PATENT DOCUMENTS

| | | | |
|---|---|---|---|
| 2010/0147286 A1* | 6/2010 | Xiang | F24S 30/458 126/600 |
| 2018/0239059 A1* | 8/2018 | Chung | H02S 20/20 |
| 2019/0356266 A1* | 11/2019 | Cai | H02S 20/30 |
| 2022/0299220 A1* | 9/2022 | Jo | F24F 11/72 |
| 2023/0146184 A1* | 5/2023 | McCutcheon | F24S 30/452 136/246 |

FOREIGN PATENT DOCUMENTS

CN          218549837 U     2/2023

* cited by examiner

*Primary Examiner* — Jayne L Mershon

(57) ABSTRACT

The present invention provides an automatic solar tracking photovoltaic power generation device, comprising a box body and a solar panel arranged above the box body. The bottom of the solar panel is equipped with a continuously adjustable component. Inside the box body, there are interconnected worm gear and worm components, and a gear transmission component. The worm gear and worm components are connected to the continuously adjustable component. The present invention solves the problems of existing devices, such as single-direction adjustment and low collection efficiency. It automatically tracks the sun in both latitude and longitude directions, with continuous adjustment. During normal operation, no manual intervention is required. It is easy to use, with a self-locking structure, minimal impact from wind loads, and self-reporting of faults.

9 Claims, 17 Drawing Sheets

AUTOMATIC SOLAR TRACKING PHOTOVOLTAIC POWER GENERATION DEVICE

TECHNICAL FIELD

This invention relates to the field of new energy technology, particularly involving an automatic tracking photovoltaic power generation device for tracking the sun.

BACKGROUND

Solar energy has significant environmental and economic benefits and is the most high-quality green and clean energy source, renewable and inexhaustible. Photovoltaic power generation is strongly supported by policies worldwide. On Sep. 22, 2020, the national government proposed at the 75th session of the United Nations General Assembly: "China will increase its national determined contributions, adopt more effective policies and measures, strive to peak carbon dioxide emissions before 2030, and aim to achieve carbon neutrality by 2060." Countries around the world have implemented a series of subsidy policies to promote the utilization and popularization of solar energy. However, the decentralized and unstable nature of solar energy, as well as the constantly changing spatial distribution, result in low utilization rates. Existing studies have shown that compared with fixed solar power generation devices, automatic solar tracking power generation devices have an absorption rate difference of 37.7%. Therefore, achieving automatic tracking of the sun for photovoltaic power generation devices is an effective way to improve the utilization of solar energy. Currently, solar panels on the market are mostly fixed, which cannot fully utilize solar energy, leading to low collection efficiency.

Existing patents include an automatic solar tracking trajectory electric power photovoltaic collection device (patent number: CN 114337509A), which changes the opening angle between two solar panels through hydraulic rods (the two panels are installed in an "L" shape, with a rotatable axis connected at the hinge). On the one hand, the angle between the two panels is always less than 180 degrees, making it impossible for the sunlight to simultaneously vertically illuminate both panels; on the other hand, with the change of seasons, the angle of incidence of sunlight changes, but the device's elevation angle is fixed, failing to maximize the utilization of solar energy. Considering the above reasons, an automatic tracking photovoltaic power generation device for tracking the sun has been invented.

SUMMARY

To address the aforementioned issues, the present invention discloses an automatic solar tracking photovoltaic power generation device, which solves the problems of single-direction adjustment and low collection efficiency of existing devices. It features automatic tracking of the sun in both azimuth and elevation directions, with continuous adjustment. During normal operation, no manual intervention is required; it is simple and convenient to use; the structure is self-locking, with minimal impact from wind loads; and it has automatic fault reporting and other advantages.

The specific solution is as follows:

An automatic solar tracking photovoltaic power generation device, comprising a box body and solar panels installed above the box body. The bottom of the solar panel is equipped with a continuous adjustment component. Inside the box body, there are mutually connected worm gear and worm components and gear transmission components, and the worm gear and worm components are connected to the continuous adjustment component.

As a further improvement of the invention, three solar fixed panels are fixed along the circumferential direction at the bottom of the solar panel. The three solar fixed panels are respectively hinged to the upper ends of rocker arms A, B, and C via D-shaped shafts A, B, and C. The lower ends of the rocker arms A, B, and C are respectively hinged to the upper ends of rotating arms A, B, and C, and the lower ends of the rotating arms A, B, and C are respectively fixed to shafts A, B, and C. Shaft A is connected to bracket D via bearing A and internally has shaft B installed through bearing B, and shaft B has shaft C installed through bearing C. The lower ends of shafts A, B, and C are respectively fixed with bevel gears A, B, and C.

As a further improvement of the invention, the worm gear and worm components include axles G and D, which are horizontally arranged and share a central axis. Shaft G is connected to the box body via bearings and elastic retaining rings D, and internally has shaft H installed, and shaft H has shaft I installed. Shafts G, H, and I are respectively fixed with bevel gears G, H, and I, and the ends of shafts H and I are provided with elastic retaining rings E and F respectively. Bevel gears G, H, and I are respectively engaged with bevel gears A, B, and C. Shaft D is connected to bracket A and the box body via bearing D, and internally has shaft E installed, which is connected to bracket B via bearing E. Shaft E has shaft F installed, which is connected to bracket C and the box body via bearing F. Shafts D, E, and F are respectively fixed with bevel gears D, E, and F, which are respectively engaged with bevel gears A, B, and C. Worm A is fixedly connected to shaft D, worm B is fixedly connected to shaft E, and worm C is fixedly connected to shaft F. Worms A, B, and C are internally equipped with elastic retaining rings A, B, and C respectively. Shaft M on worm A is connected to bracket F, bracket G, and the box body via bearing G, and worm A engages with worm gear A. Shaft N on worm B is connected to bracket F, bracket G, and the box body via bearing H, and worm B engages with worm gear B. Shaft O on worm C is connected to bracket E, bracket F, bracket G, and the box body via bearing I, and worm C engages with worm gear C.

As a further improvement of the invention, the gear transmission component comprises gear A, gear B, and gear C. Gear A, gear B, and gear C are connected to worm A, worm B, and worm C respectively via bearings. Driving piece A is fixedly connected to shaft M, driving piece B is fixedly connected to shaft N, and driving piece C is fixedly connected to shaft O. Driving piece A, driving piece B, and driving piece C are each provided with annular grooves A, B, and C respectively. Slider A is fixedly connected to inclined slider A via double-ended threaded rod A, and double-ended threaded rod A is fitted with return spring D. Drive tooth A is hinged to slider A. Slider B is fixedly connected to inclined slider B via double-ended threaded rod B, and double-ended threaded rod B is fitted with return spring E. Drive tooth B is hinged to slider B. Slider C is fixedly connected to inclined slider C via double-ended threaded rod C, and double-ended threaded rod C is fitted with return spring F. Drive tooth C is hinged to slider C.

As a further improvement of the invention, slider A is located on the outer side of baffle E, and inclined slider A is located on the inner side of baffle E. One end of return spring D contacts inclined slider A, and the other end contacts the inner wall of baffle E. Slider B is located on the outer side of baffle F, and inclined slider B is located on the inner side of baffle F. One end of return spring E contacts inclined slider B, and the other end contacts the inner wall of baffle F. Slider C is located on the outer side of baffle G, and inclined slider C is located on the inner side of baffle G. One end of return spring F contacts inclined slider C, and the other end contacts the inner wall of baffle G.

As a further improvement of the invention, the drive teeth A, drive teeth B, and drive teeth C are respectively matched with internal gear rings A, internal gear rings B, and internal gear rings C. Moving sleeve A, moving sleeve B, and moving sleeve C are each connected to sleeve A, sleeve B, and sleeve C via D-shaped holes. Sleeves A, B, and C are fixedly connected to bracket G, and one end of return springs N, O, and P is respectively fixedly connected to sleeves A, B, and C, while the other end is respectively fixedly connected to moving sleeves A, B, and C. Moving sleeves A, B, and C respectively contact microswitches D, E, and F. Levers A, B, and C are each slidably connected to shafts J, K, and L via D-shaped holes, and shafts J, K, and L are each fitted with return springs A, B, and C. The lower ends of levers A, B, and C are respectively connected to annular grooves A, B, and C on moving sleeves A, B, and C. Electromagnets A, B, and C are each in contact with one side of levers A, B, and C respectively. The slide rail E on the slider is connected to the moving groove inside the box body, and one end of the slider is equipped with return spring G, while the push rod on electromagnet D is in contact with one end of the slider. The triangular components D, E, and F on the slider respectively contact the triangular components A, B, and C on moving sleeves A, B, and C, and microswitches I and J are respectively provided at both ends of the slider. Gear A meshes with gear B, gear B meshes with gear C, and gear D meshes with gear B. The motor is mounted on bracket H, the rotor shaft of the motor is fixedly connected to the sun gear, the planet gear meshes with the sun gear, and the planet gear is sleeved with a planet carrier. Shaft M on the planet carrier is fixedly connected to gear D, the planet gear meshes with the outer gear ring, and the outer gear ring is equipped with pawls A, B, and arcuate protrusions. Microswitches G and H are distributed on both sides of the arcuate protrusion.

As a further improvement of the invention, pawl A meshes with pawl wheel A and is sleeved on shaft N of bracket I. One end of return spring H is fixedly connected to pawl A, and the other end is fixedly connected to baffle B. One side of inclined slider D is in contact with the other side of pawl A, and the slide rail A on inclined slider D is connected to the slide groove B on bracket I, while one end of return spring I is in contact with the bottom end of inclined slider D, and the other end is in contact with bracket I. The slope of inclined slider D contacts the slope of inclined slider A, and the slide rail B on inclined slider A is connected to the slide groove A on bracket I, while one side of return spring J is fixedly connected to one end of inclined slider A, and the other end is fixedly connected to bracket I. The push rod of electromagnet F contacts one end of the concave groove on inclined slider A, while the push rod of electromagnet E contacts the upper end of inclined slider D. Pawl B meshes with pawl wheel B and is sleeved on shaft O of bracket J. One end of return spring K is fixedly connected to pawl B, and the other end is fixedly connected to baffle D. One side of inclined slider E is in contact with the other end of pawl B, and the slide rail D on inclined slider E is connected to the slide groove D on bracket J, while one end of return spring L is in contact with the bottom end of inclined slider E, and the other end is in contact with bracket J. The slope of inclined slider E contacts the slope of inclined slider B, and the slide rail C on inclined slider B is connected to the slide groove C on bracket J, while one side of return spring M is fixedly connected to one end of inclined slider B, and the other end is fixedly connected to bracket J. The push rod of electromagnet H contacts one end of the concave groove on inclined slider B, while the push rod of electromagnet G contacts the upper end of inclined slider E. Bracket I and bracket J are fixedly connected to the box body.

As a further improvement of the invention, the structures of D-shaped shafts A, B, and C are identical, all being cylindrical with symmetrical ends and a D-shaped cross-section. One end of D-shaped shaft A is fixedly connected to the solar fixed panel, and the other end is installed with photosensitive element A, while the middle part is hinged to the upper end of rocker arm A. Similarly, one end of D-shaped shaft B is fixedly connected to the solar fixed panel, and the other end is installed with photosensitive element B, while the middle part is hinged to the upper end of rocker arm B. Likewise, one end of D-shaped shaft C is fixedly connected to the solar fixed panel, and the other end is installed with photosensitive element C, while the middle part is hinged to the upper end of rocker arm C. The photosensitive elements A, B, and C are distributed at 120° intervals.

As a further improvement of the invention, microswitches A, B, and C are fixedly installed on rotating arms A, B, and C respectively, and travel switches K and L are respectively set on rocker arms B and C.

As a further improvement of the invention, the top of the box body is equipped with a box cover adapted to it. The middle part of the top surface of the box cover is provided with a handle, and alarm lights are installed at two corners of the top. The control module and battery are installed inside the box body, and a power switch is set on the side, with OFF and ON positions at its two ends.

In comparison with the prior art, the advantageous effects of the present invention are as follows:

Achieving continuous adjustment of the solar panel angle through worm gear and worm, gear transmission, rocker arms, and rocker arms.

Real-time detection of light intensity through three photosensitive elements to achieve automatic tracking of the sun by the solar panel in both azimuth and elevation directions.

The worm gear and worm mechanism achieve self-locking after adjustment to prevent wind load from causing deviation in the angle of the solar panel.

The device is equipped with a planetary gear mechanism. When the transmission structure is jammed, the locking structure of the outer gear ring will be quickly released. The outer gear ring rotates to touch the microswitch, causing the device to emergency stop (motor power-off), and the alarm sounds to ensure safety.

The device achieves automatic adjustment in both longitude and latitude directions to automatically track the sun, ensuring that the solar panel is approximately perpendicular to the sunlight to maximize the light flux received by the solar panel. During normal operation, no manual intervention is required, making it simple and convenient to use.

Figure 1:
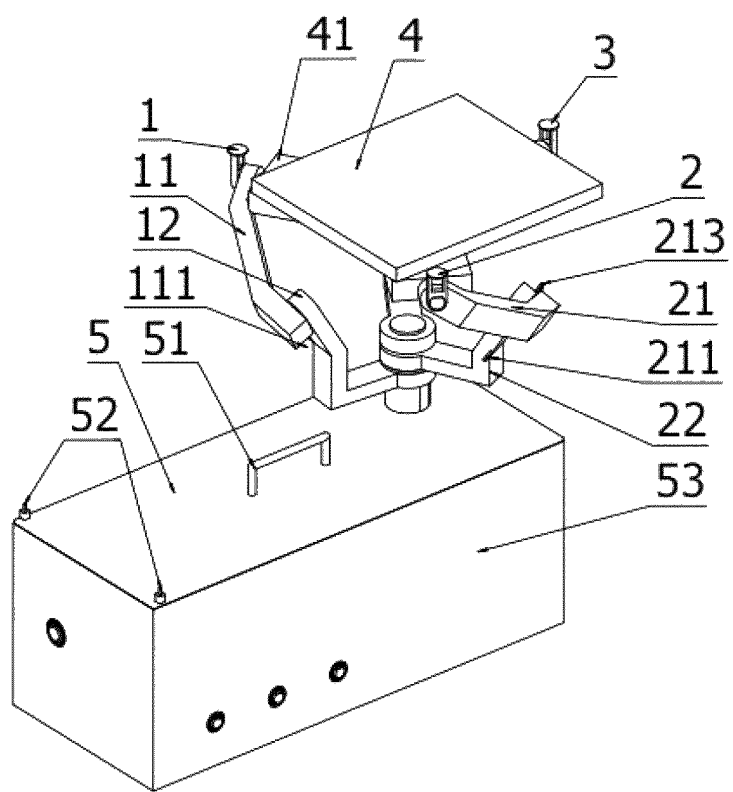
FIG. 1 is a schematic structural diagram of the present invention.
Figure 2:
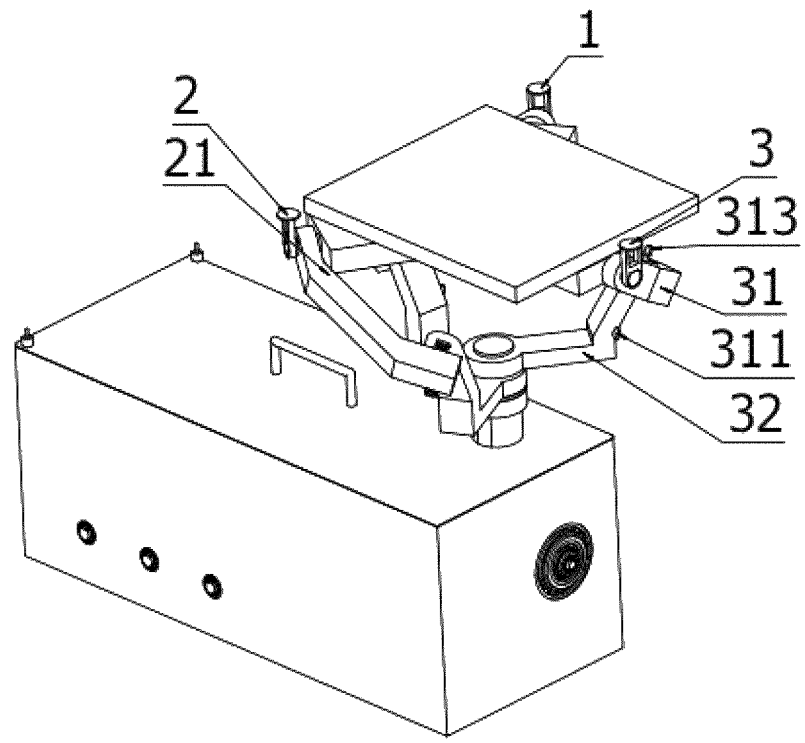
FIG. 2 is a right view of FIG. 1.
Figure 3:
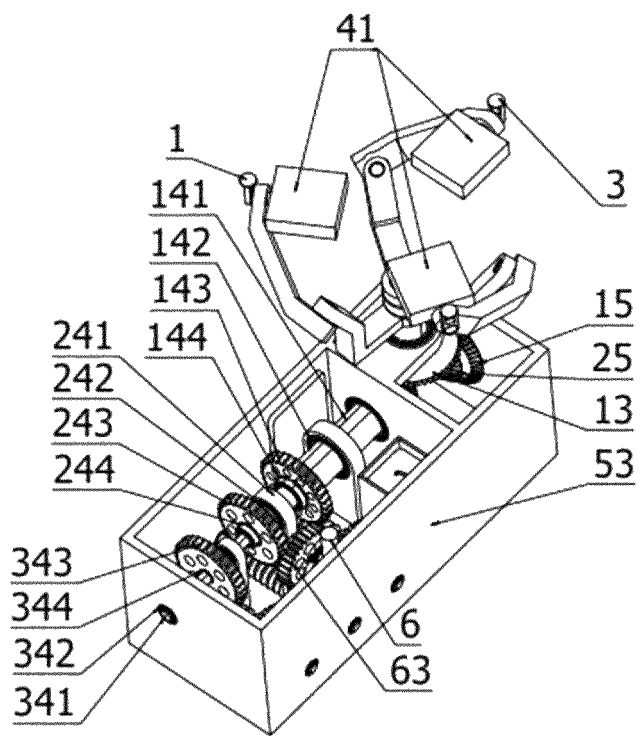
FIG. 3 is a schematic structural diagram of FIG. 1 with the box cover removed.
Figure 4:
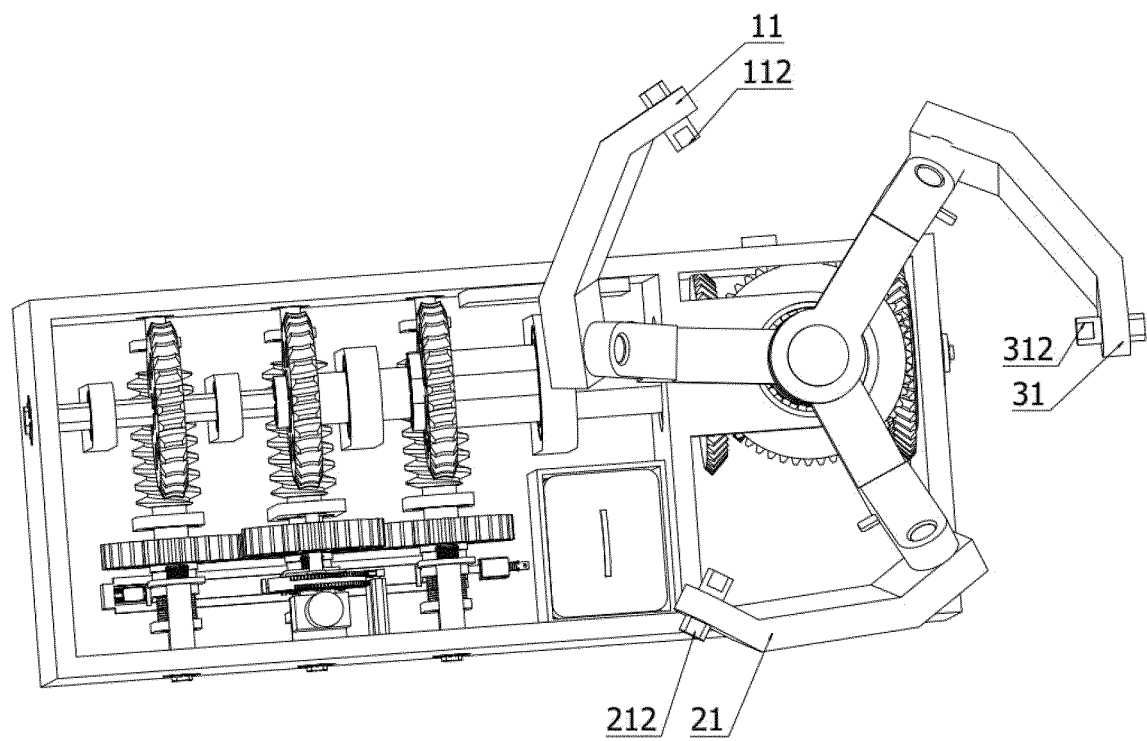
FIG. 4 is a schematic structural diagram of FIG. 1 with the box cover, solar panels, solar fixed panels and other parts removed.
Figure 5:
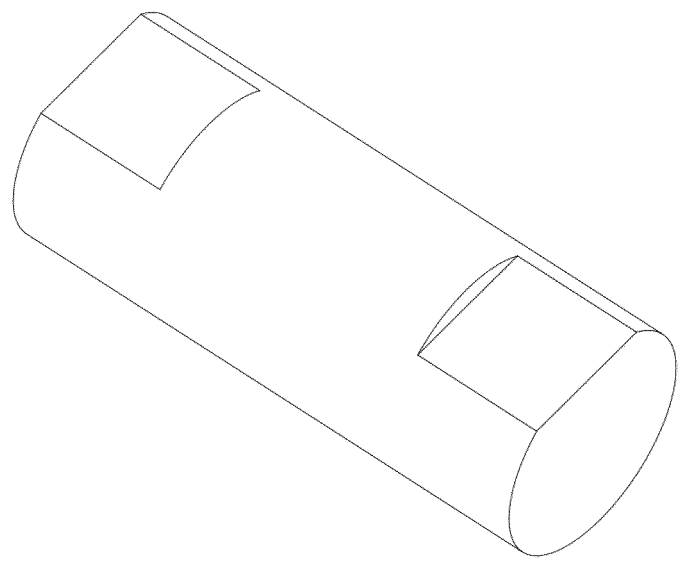
FIG. 5 is a schematic structural diagram of the D-shaped shaft A, D-shaped shaft B, and D-shaped shaft C in FIG. 4.
Figure 6:
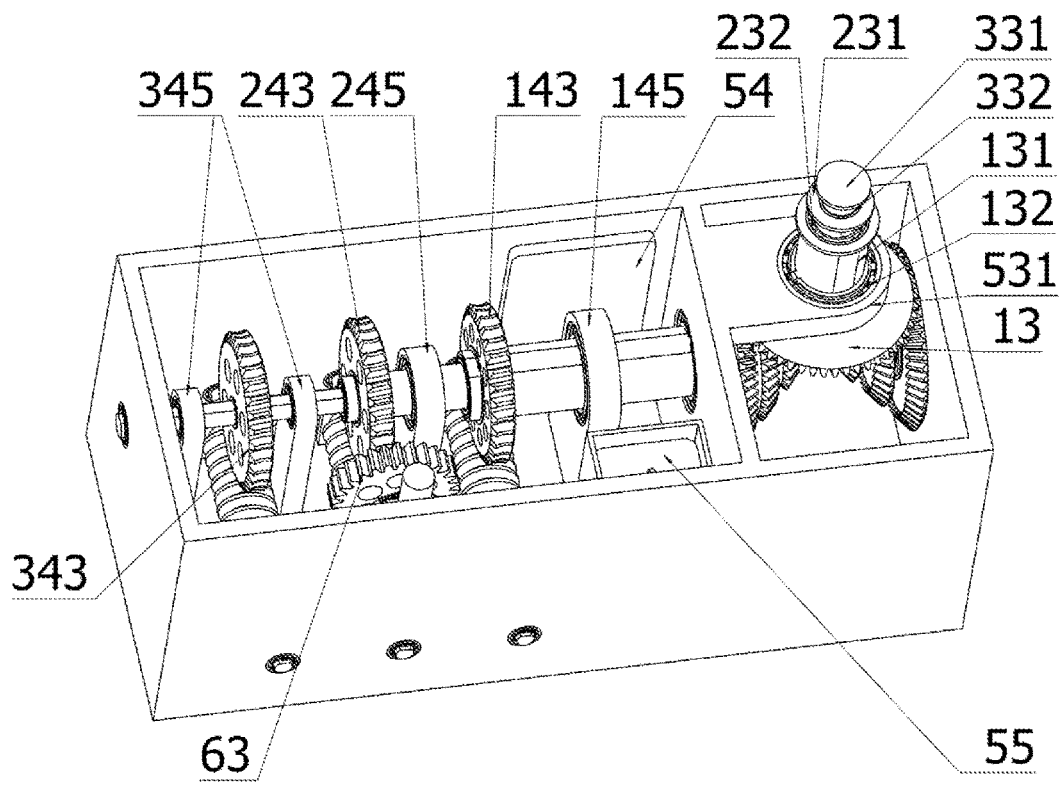
FIG. 6 is a schematic structural diagram of the worm gear assembly and gear transmission assembly.
Figure 7:
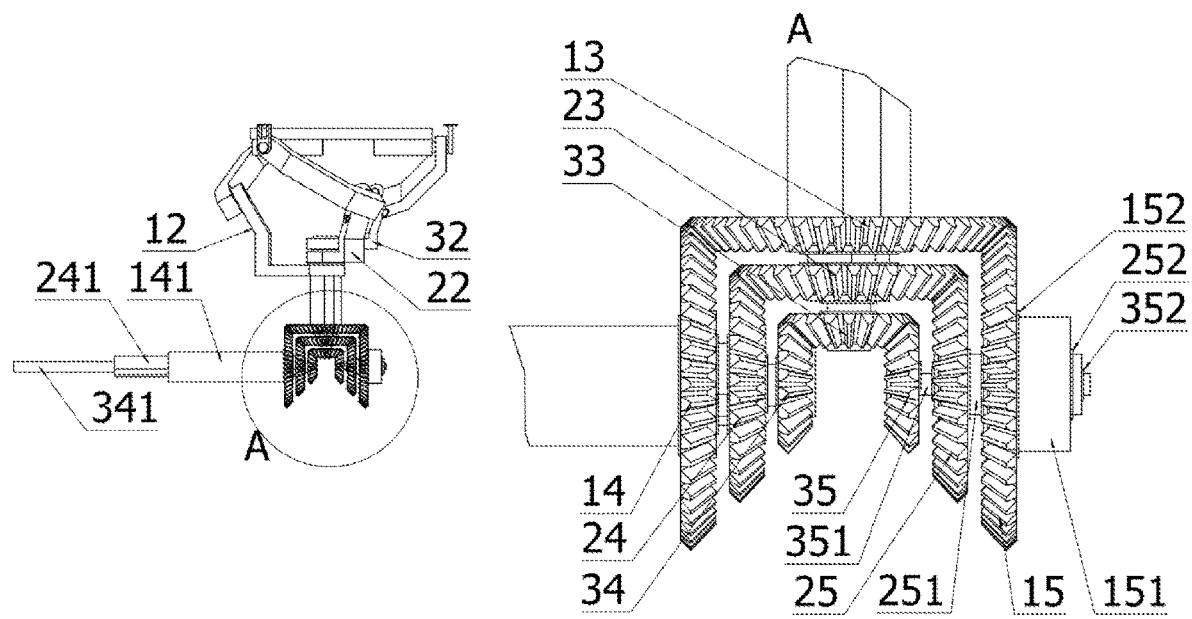
FIG. 7 is a schematic assembly diagram of the worm gear assembly and the stepless adjustment assembly and a partial enlarged view thereof. The left picture is an assembly diagram, and the right picture is a partial enlarged view of position A in the left picture.
Figure 8:
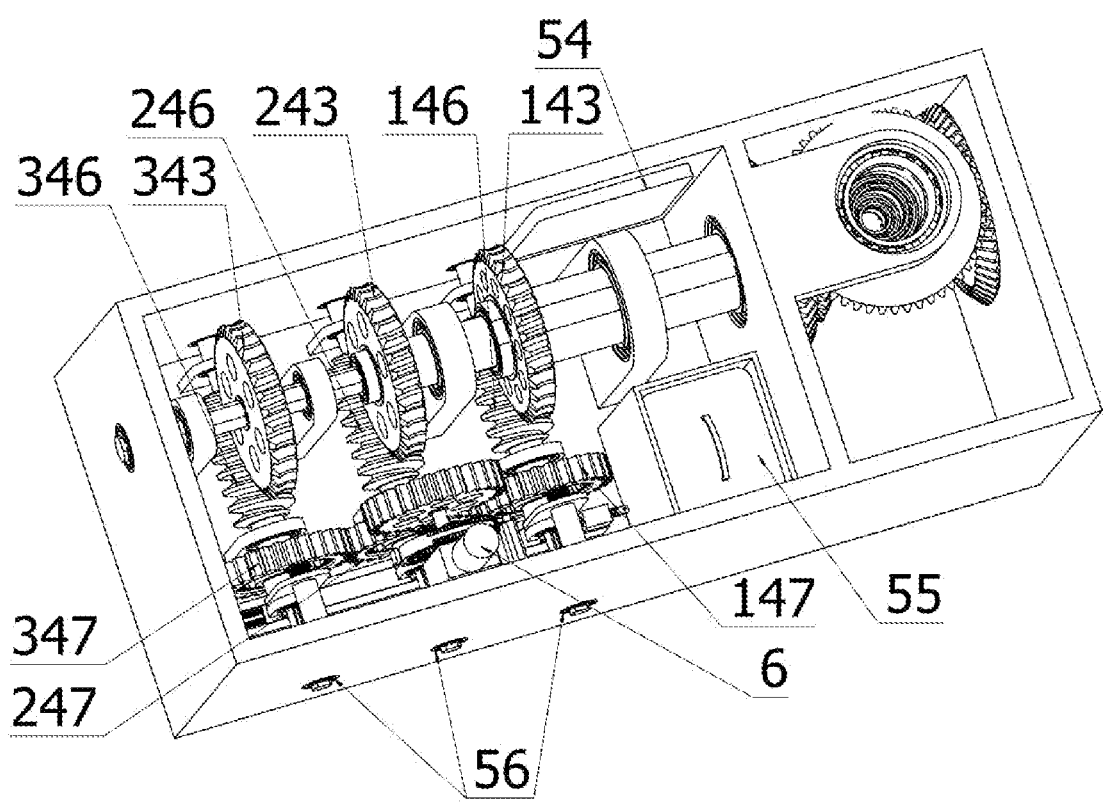
FIG. 8 is a schematic structural diagram of FIG. 4 with parts such as bevel gear A, bevel gear B and bevel gear C removed.
Figure 9:
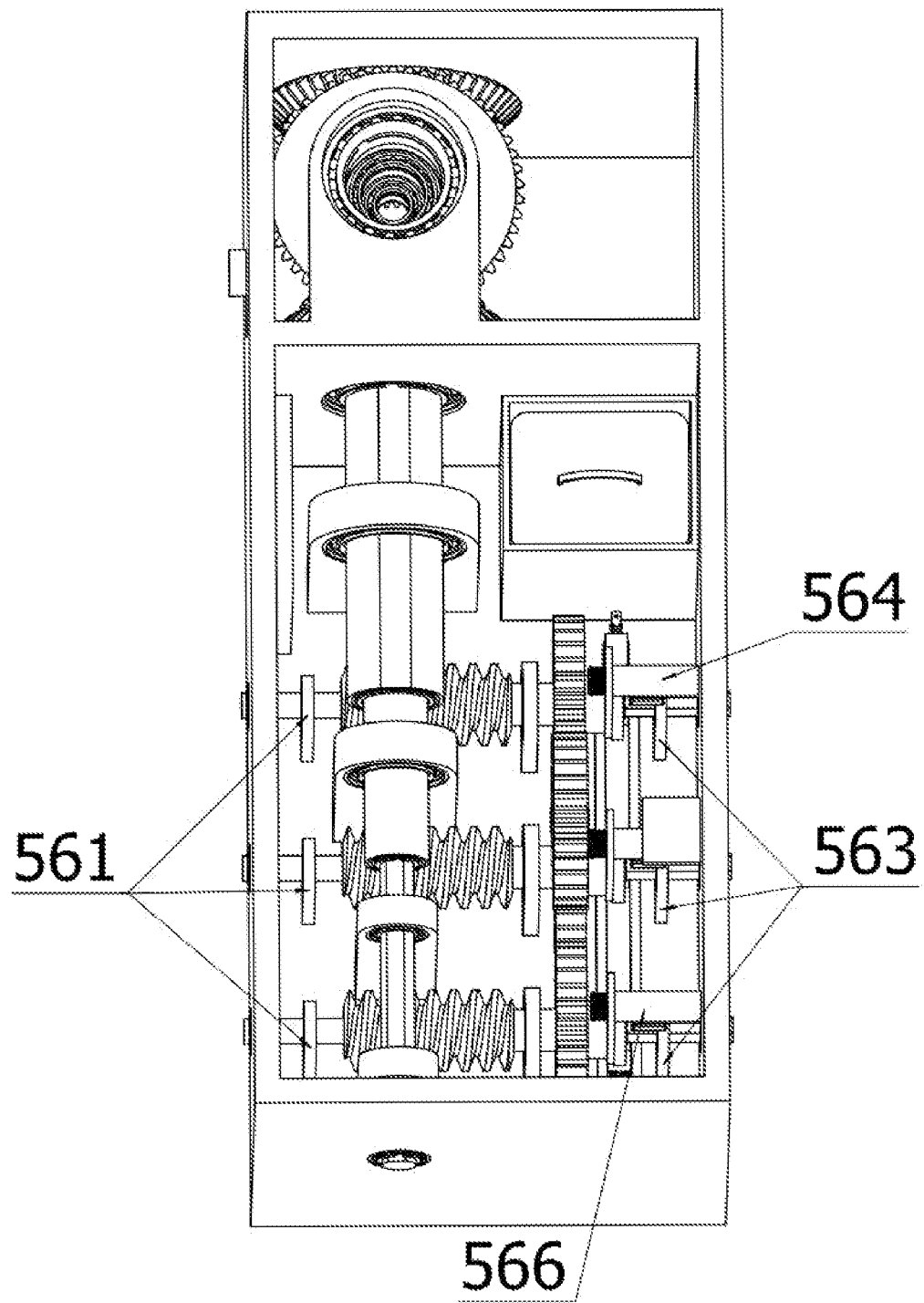
FIG. 9 is a schematic structural diagram of FIG. 8 with parts such as worm gear A, worm gear B, and worm gear C removed.
Figure 10:
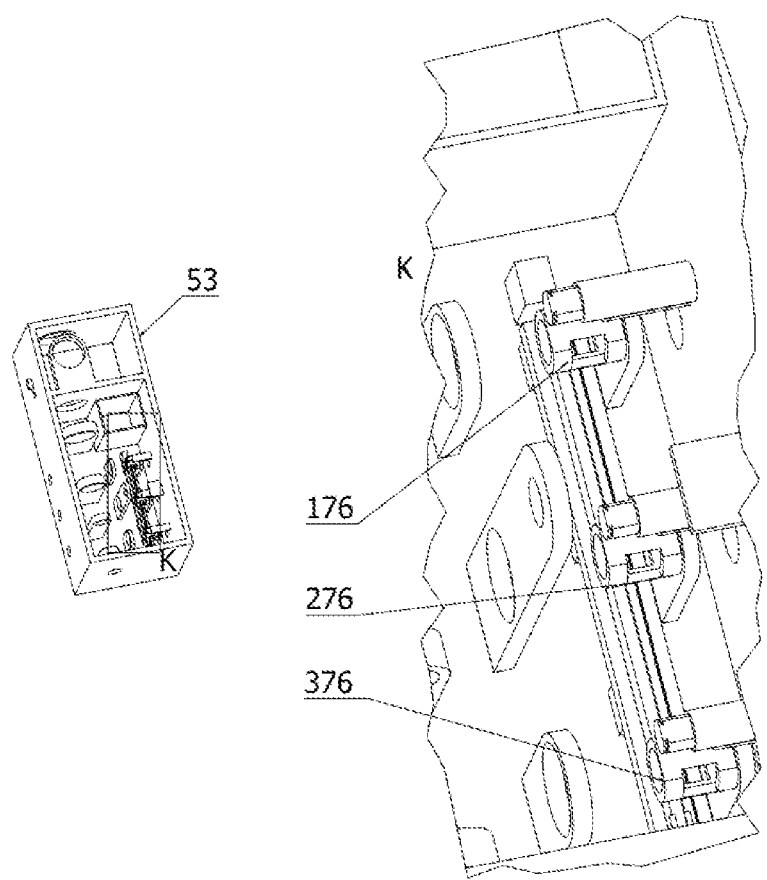
FIG. 10 is an internal schematic diagram of the box and its partial enlarged view. The left picture is the internal schematic diagram, and the right picture is the partial enlarged view of K in the left picture.
Figure 11:
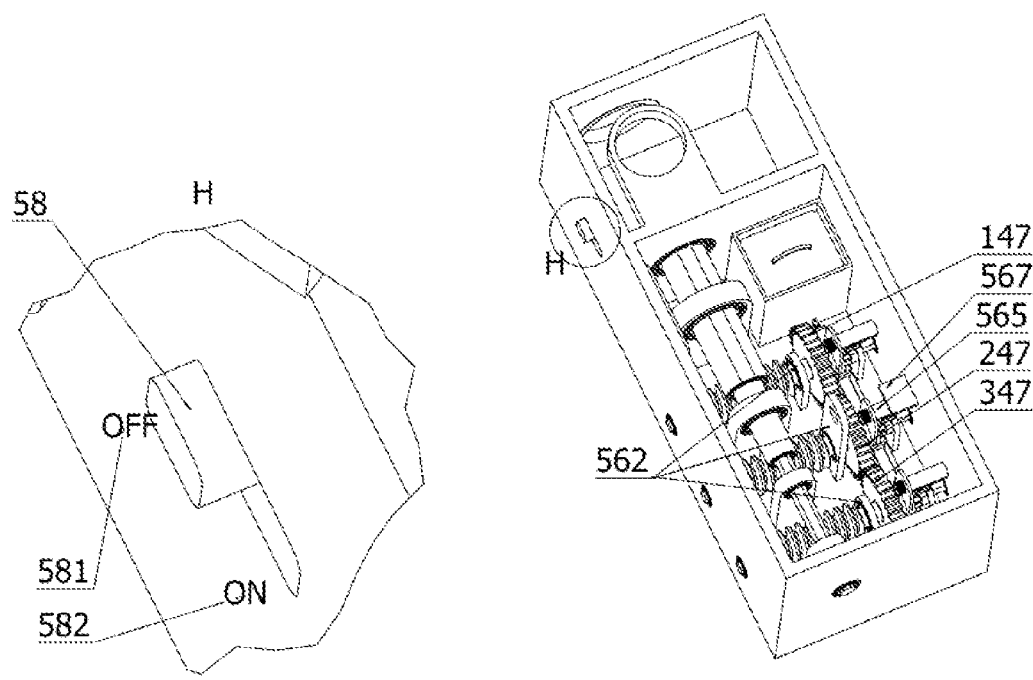
FIG. 11 is a left view of FIG. 9 and a partial enlarged view thereof, wherein the left picture is the left view of FIG. 9 and the right picture is a partial enlarged view of position H in the left figure.
Figure 12:
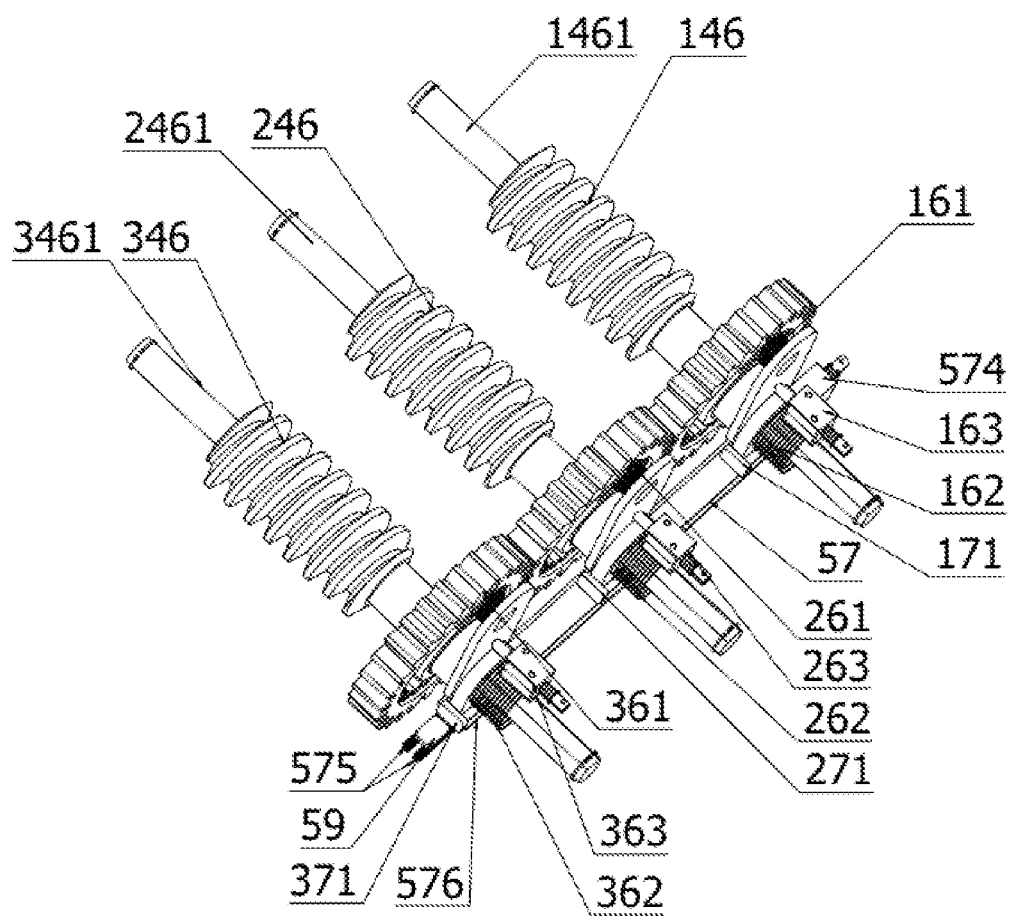
FIG. 12 is a schematic structural diagram of the worm.
Figure 13:
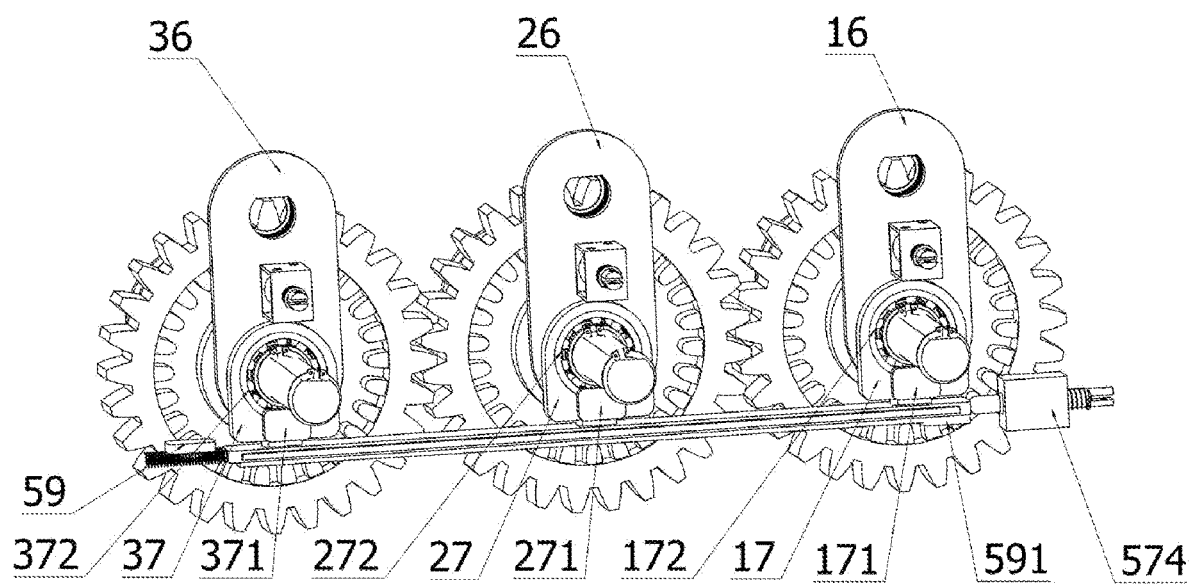
FIG. 13 is a right view of FIG. 12.
Figure 14:
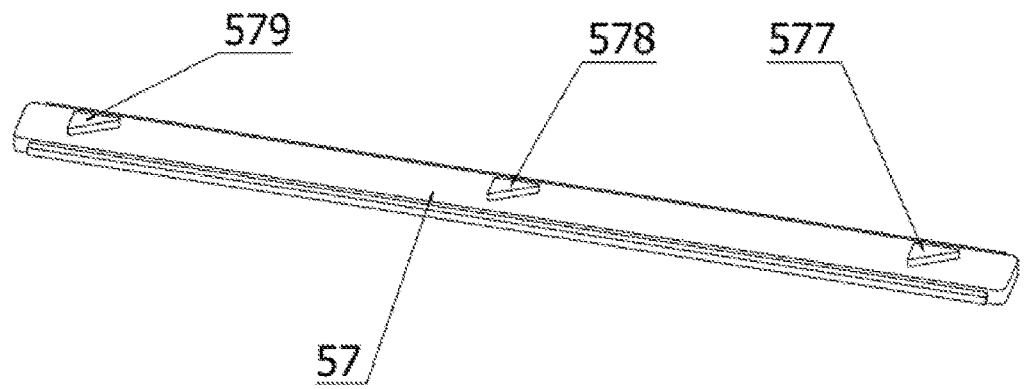
FIG. 14 is a schematic structural diagram of the skateboard.
Figure 15:
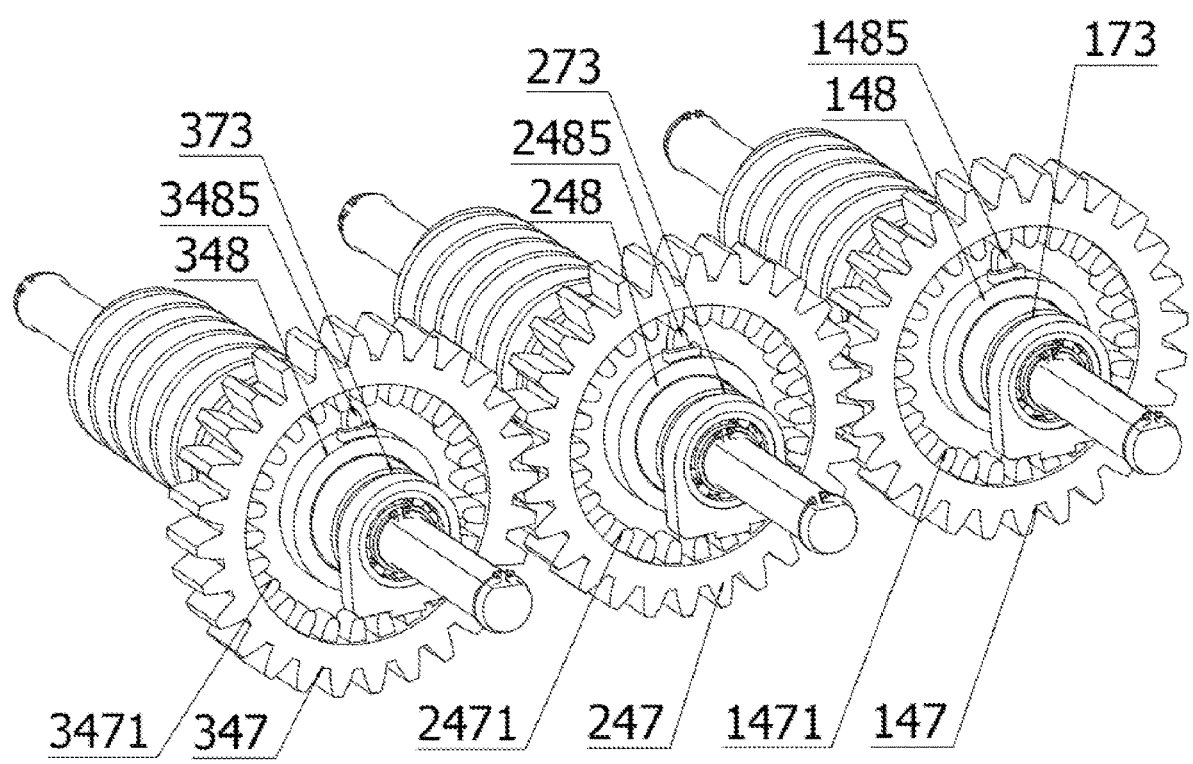
FIG. 15 is a schematic structural diagram of FIG. 12 with parts such as lever A, lever B and lever C removed.
Figure 16:
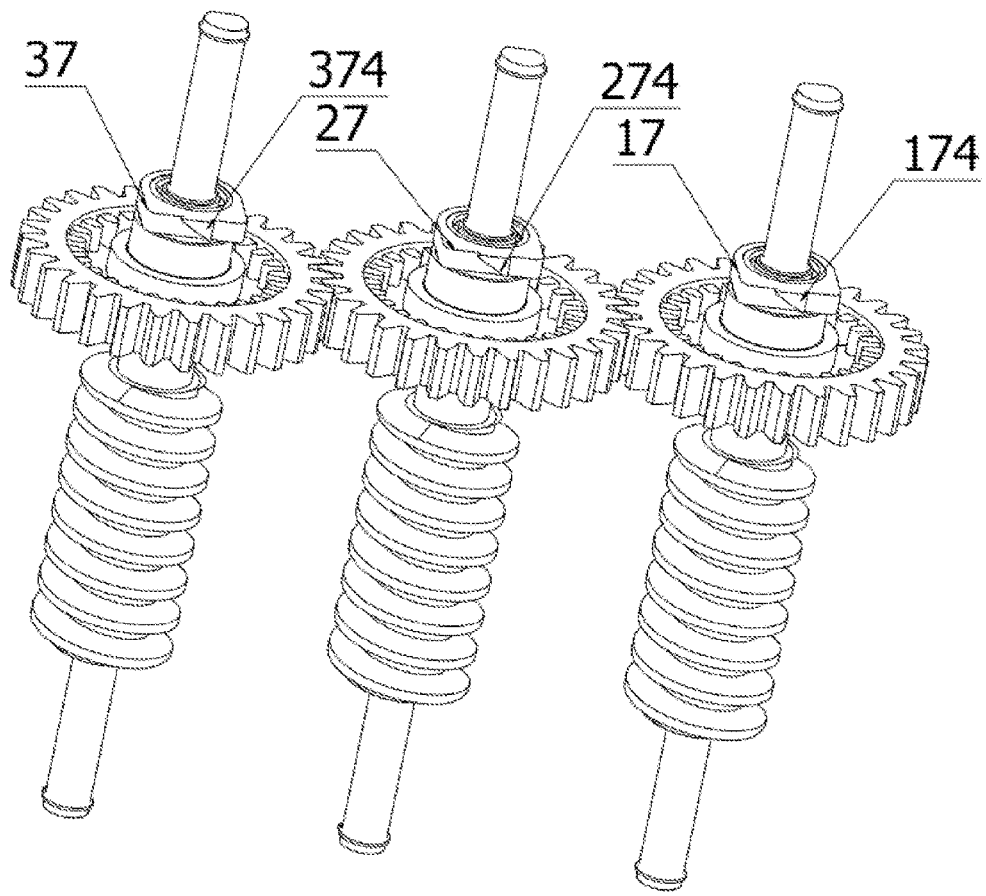
FIG. 16 is a bottom schematic diagram of FIG. 15.
Figure 17:
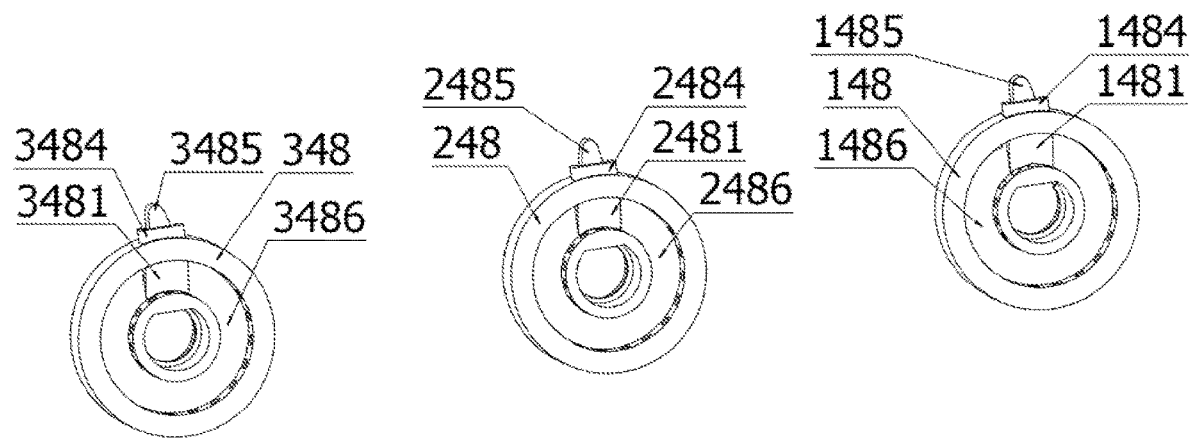
FIG. 17 is a schematic structural diagram of the driving part A, the driving part B and the driving part C, in which the driving part A, the driving part B and the driving part C are in order from left to right.
Figure 18:
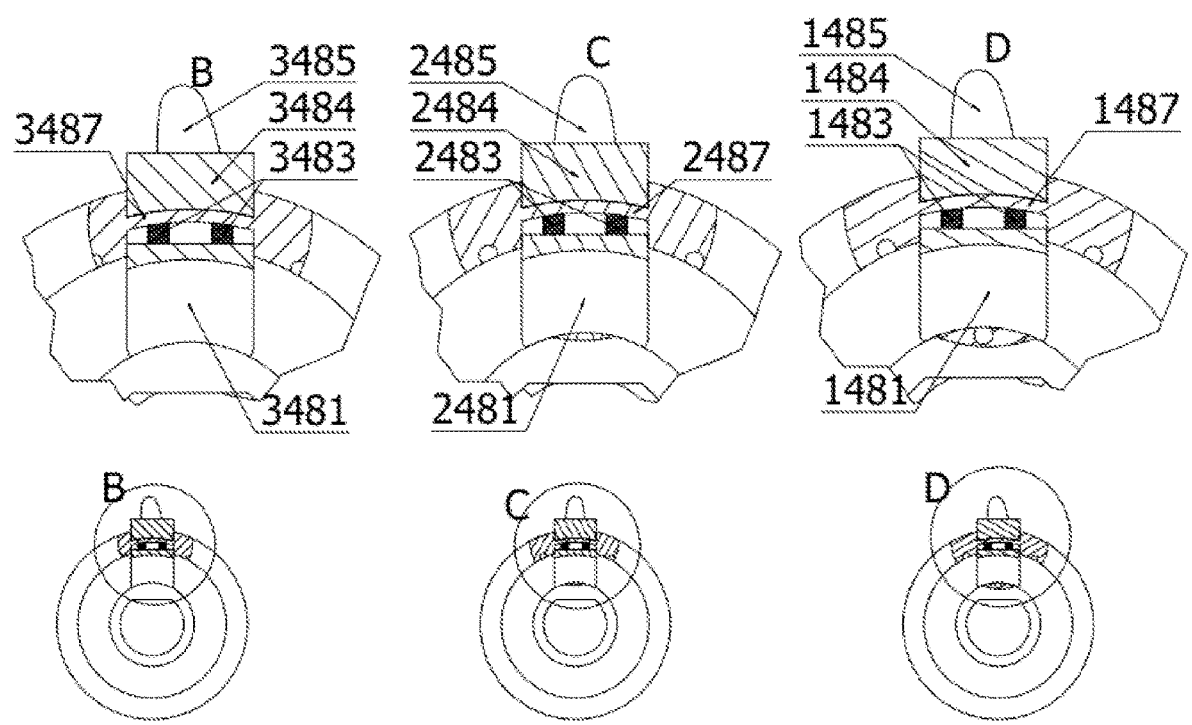
FIG. 18 is a group of partial enlarged cross-sectional views of driving member A, driving member B and driving member C. The three groups of views from left to right respectively represent partial enlarged cross-sections of driving member A, driving member B and driving member C. Figures, the upper images of each group of images are partial enlarged images of the lower images.
Figure 19:
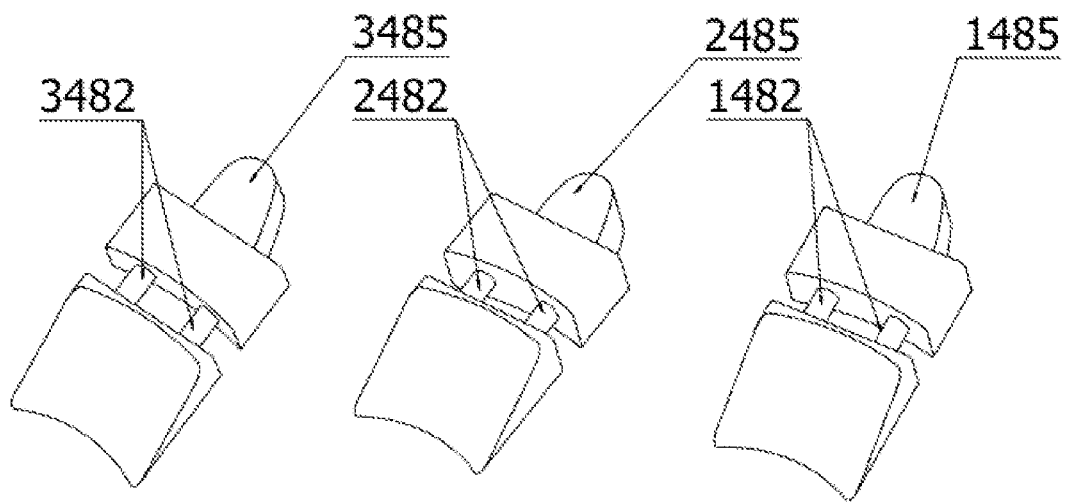
FIG. 19 is a schematic structural diagram of transmission tooth A, transmission tooth B and transmission tooth C. From left to right are the structural schematic diagrams of transmission tooth A, transmission tooth B and transmission tooth C respectively.
Figure 20:
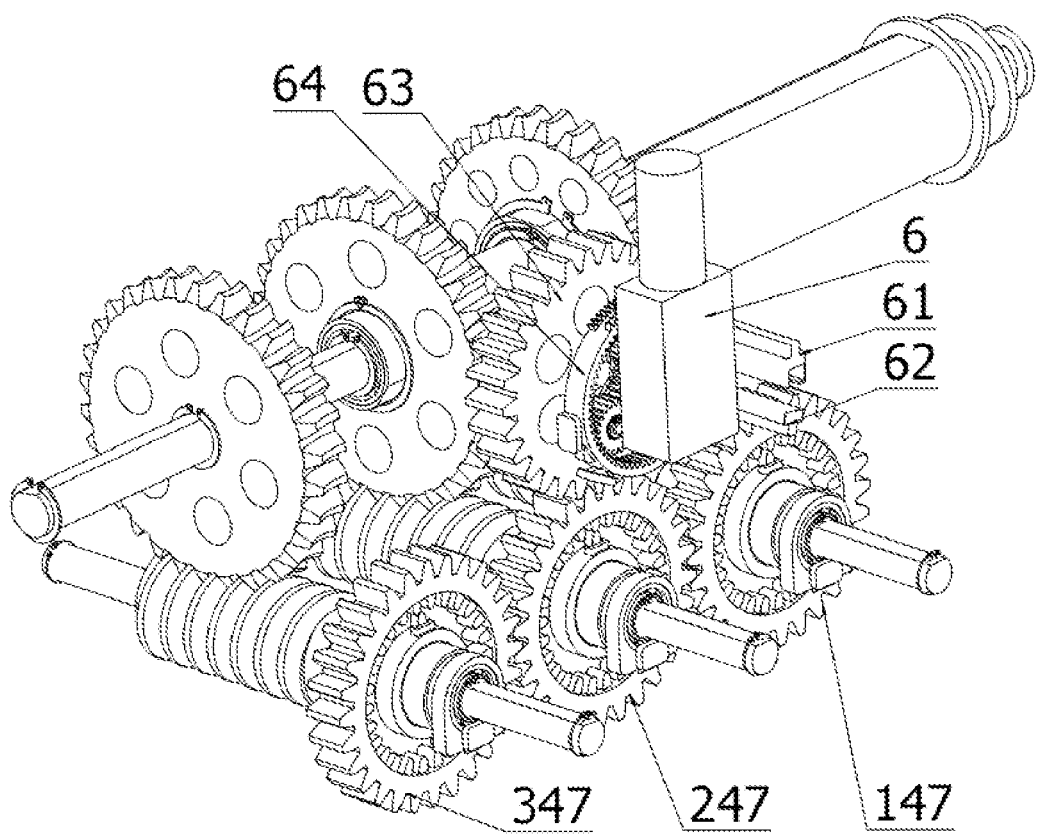
FIG. 20 is a schematic structural diagram of FIG. 8 with the box and other parts removed.
Figure 21:
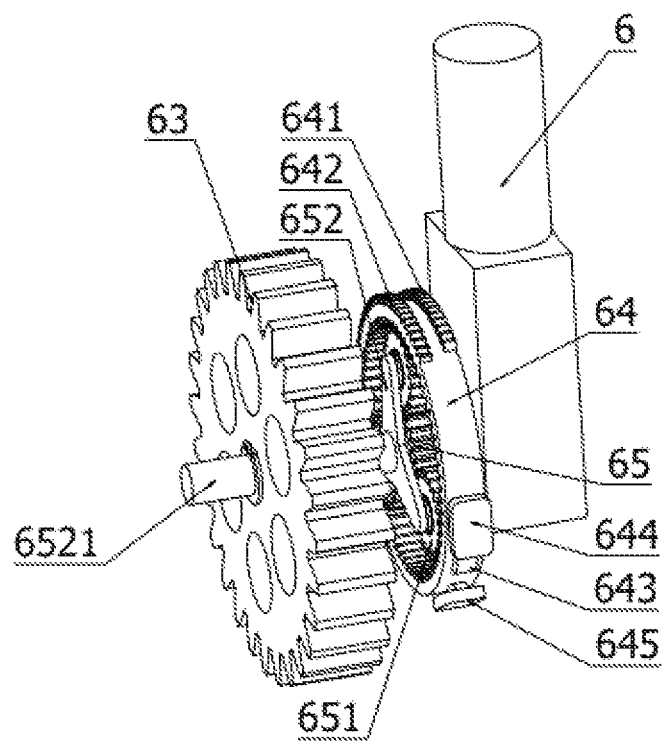
FIG. 21 is a schematic structural diagram of gear D and the external ring gear.
Figure 22:
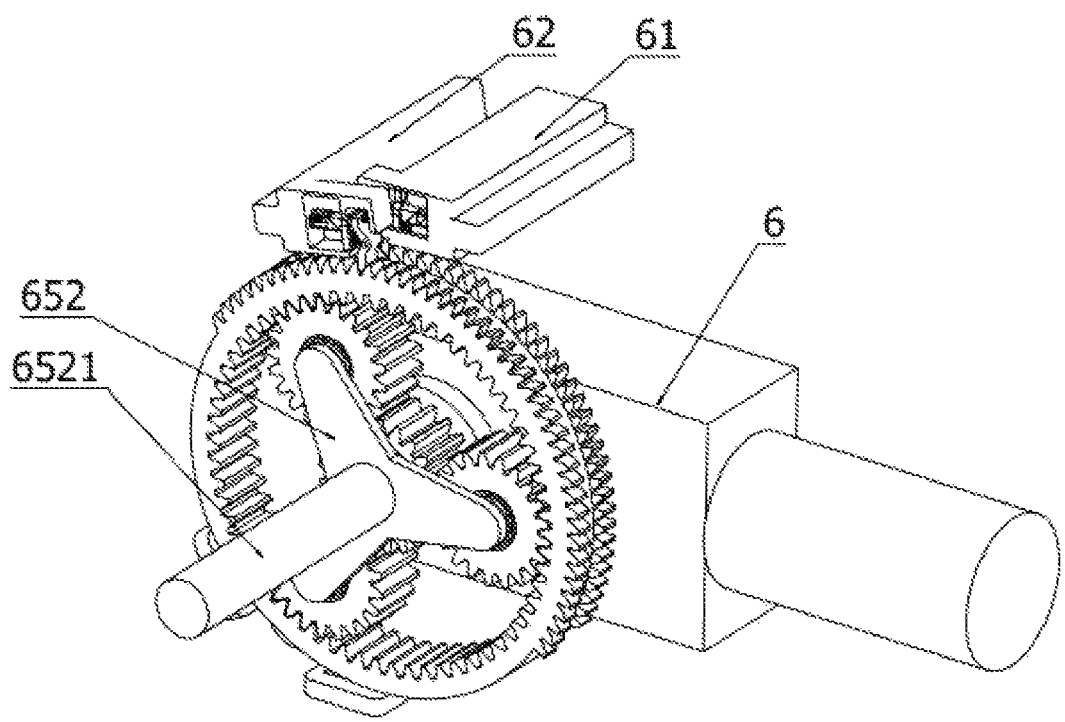
FIG. 22 is a schematic structural diagram of FIG. 21 with bracket J and other parts removed.
Figure 23:
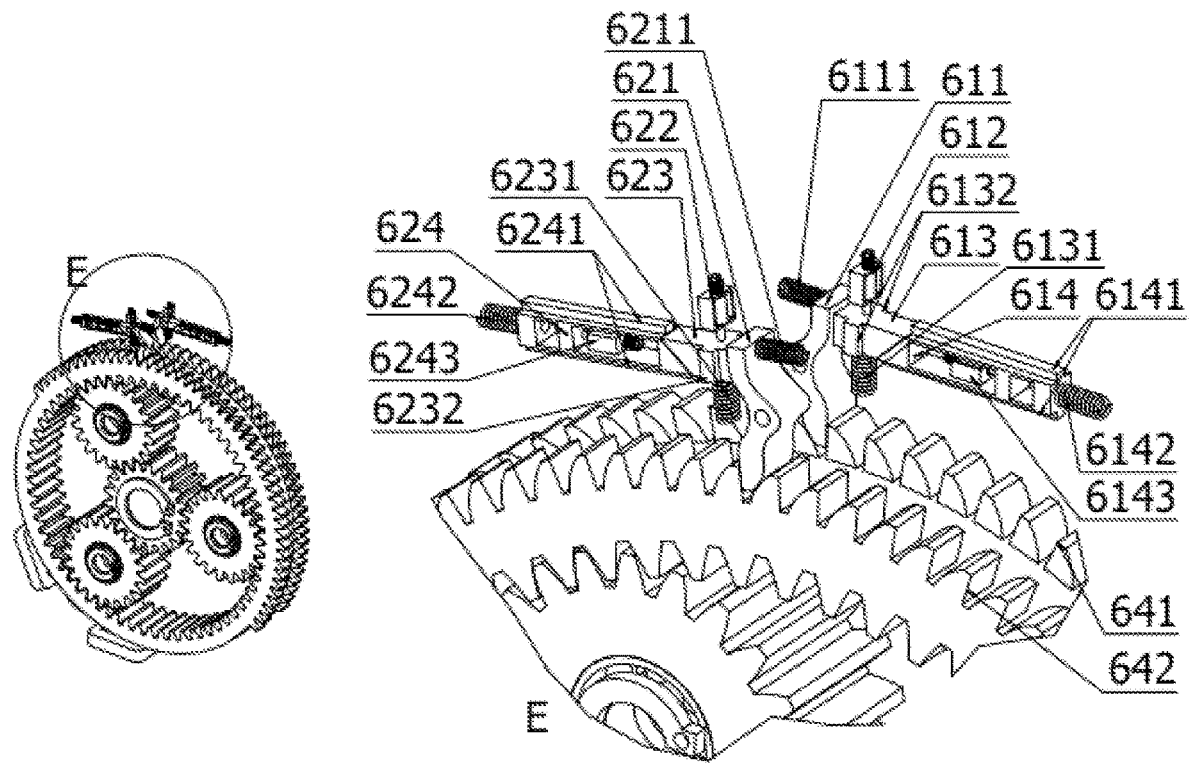
FIG. 23 is a partial structural view and an enlarged view of FIG. 21 after removing the motor, bracket I, bracket J and other parts. The left image is a partial structural view, and the right image is a partial enlarged view of E in the left image.
Figure 24:
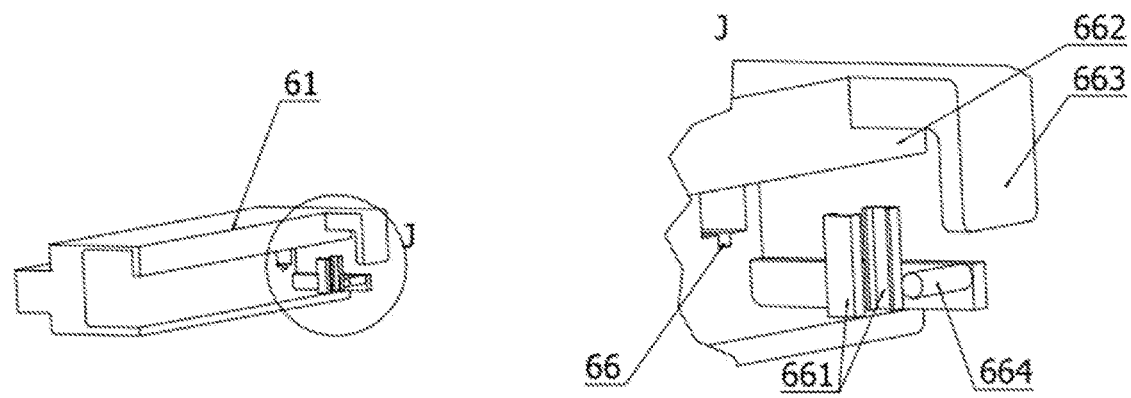
FIG. 24 is a structural diagram and a partial enlarged view of the stent I. The left picture is a structural diagram, and the right picture is a partial enlarged view of J in the left picture.
Figure 25:
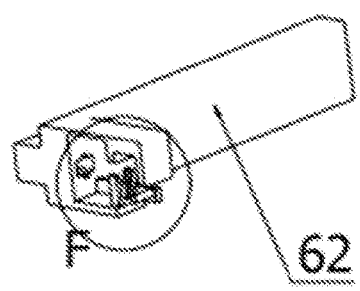
FIG. 25 is a structural diagram and a partial enlarged view of the bracket J. The left picture is a structural diagram, and the right picture is a partial enlarged view of F in the left picture.
Figure 25:
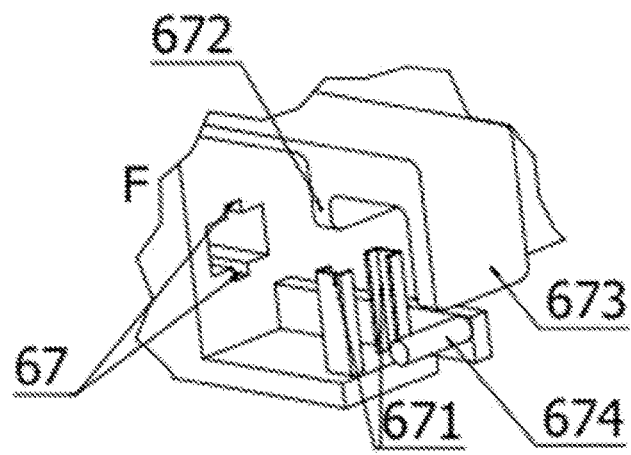

wherein, 1—Photosensitive component A, 11—Rocker A, 111—Micro switch A, 112—D-shaped shaft A, 12—Rotating arm A, 13—Bevel gear A, 131—Shaft A, 132—Bearing A, 14—Bevel gear D, 141—Shaft D, 142—Bearing D, 143—Worm A, 144—Elastic stop ring A, 145—Bracket A, 146—Worm gear A, 1461—Shaft M, 147—Gear A, 1471—Internal gear A, 148—Drive component A, 1481—Inclined plane slider A, 1482—Double-ended threaded rod A, 1483—Reset spring D, 1484—Slider A, 1485—Transmission gear A, 1486—Annular groove A, 1487—Baffle E, 15—Bevel gear G, 151—Shaft G, 152—Elastic stop ring D, 16—Lever A, 161—Reset spring A, 162—Reset spring N, 163—Electromagnet A, 17—Moving sleeve A, 171—Micro switch D, 172—Bearing G, 173—Annular groove A, 174—Triangular component A, 176—Sleeve A, 2—Photosensitive component B, 21—Rocker B, 211—Micro switch B, 212—D-shaped shaft B, 213—Micro switch K, 22—Rotating arm B, 23—Bevel gear B; 231—Shaft B, 232—Bearing B, 24—Bevel gear E, 241—Shaft E, 242—Bearing E, 243—Worm B, 244—Elastic stop ring B, 245—Bracket B, 246—Worm gear B, 2461—Shaft N, 247—Gear B, 2471—Internal gear B, 248—Drive component B, 2481—Inclined plane slider B, 2482—Double-ended threaded rod B, 2483—Reset spring E, 2484—Slider B, 2485—Transmission gear B, 2486—Annular groove B, 2487—Baffle F, 25—Bevel gear H, 251—Shaft H, 252—Elastic stop ring E, 26—Lever B, 261—Reset spring B, 262—Reset spring O, 263—Electromagnet B, 27—Moving sleeve B, 271—Micro switch E, 272—Bearing H, 273—Annular groove B, 274—Triangular component B, 276—Sleeve B, 3—Photosensitive component C, 31—Rocker C, 311—Micro switch C, 312—D-shaped shaft C, 313—Micro switch L, 32—Rotating arm C, 33—Bevel gear C, 331—Shaft C, 332—Bearing C, 34—Bevel gear F, 341—Shaft F, 342—Bearing F, 343—Worm C, 344—Elastic stop ring C, 345—Bracket C, 346—Worm gear C, 3461—Shaft O, 347—Gear C, 3471—Internal gear C, 348—Drive component C, 3481—Inclined plane slider C, 3482—Double-ended threaded rod C, 3483—Reset spring F, 3484—Slider C, 3485—Transmission gear C, 3486—Annular groove C, 3487—Baffle G; 35—Bevel gear I, 351—Shaft I, 352—Elastic stop ring F, 36—Lever C, 361—Reset spring C, 362—Reset spring P, 363—Electromagnet C, 37—Moving sleeve C, 371—Micro switch F, 372—Bearing I, 373—Annular groove C, 374—Triangular component C, 376—Sleeve C, 4—Solar panel, 41—Solar panel mounting plate, 5—Box cover, 51—Handle, 52—Alarm light, 53—Enclosure, 531—Bracket D, 54—Control module, 55—Battery, 56—Bearing J, 561—Bracket E, 562—Bracket F, 563—Bracket G, 564—Shaft J, 565—Shaft K, 566—Shaft L, 567—Bracket H, 57—Slider, 574—Electromagnet D, 575—Reset spring G, 576—Slide rail E, 577—Triangular component D, 578—Triangular component E, 579—Triangular component F, 58—Power switch, 581—OFF position, 582—ON position, 59—Micro switch I, 591—Micro switch J, 6—Motor, 61—Bracket I, 611—Pawl A; 6111—Reset spring H, 612—Electromagnet E, 613—Inclined plane slider D, 6131—Reset spring I, 6132—Slide rail A, 614—Inclined plane slide A, 6141—Slide rail B, 6142—Reset spring J, 6143—Electromagnet F, 62—Bracket J, 621—Pawl B, 6211—Reset spring K, 622—Electromagnet G, 623—Inclined plane slider E, 6231—Reset spring L, 6232—Slide rail D, 624—Inclined plane slide B, 6241—Slide rail C, 6242—Reset spring M, 6243—

Electromagnet H, 63—Gear D, 64—External gear, 641—Ratchet A, 642—Ratchet B, 643—Circular convex platform, 644—Micro switch G, 645—Micro switch H, 65—Sun gear, 651—Planetary gear, 652—Planetary carrier, 6521—Shaft M, 66—Groove A, 661—Groove B, 662—Baffle A, 663—Baffle B, 664—Shaft N, 67—Groove C, 671—Groove D, 672—Baffle C, 673—Baffle D, 674—Shaft O.

DETAILED DESCRIPTION OF EMBODIMENTS

The present invention will be further clarified below with reference to the accompanying drawings and specific embodiments. It should be understood that the following specific embodiments are only used to illustrate the present invention and are not intended to limit the scope of the present invention.

Embodiment

In the initial state, the power switch (58) on the enclosure (53) is set to the OFF position (581). The solar panel (4) is fixed on three solar panel mounting plates (41). Photosensitive components A (1), B (2), and C (3) are each fixedly connected to the D-shaped shafts on the solar panel mounting plates (41) and are distributed at 120 intervals. Rockers A (11), B (21), and C (31) are hinged to the D-shaped shafts on the solar panel mounting plates (41) and correspond to photosensitive components A (1), B (2), and C (3) respectively (to detect the light intensity in real-time for the solar rays to be approximately perpendicular to the solar panel (4)). Rotating arms A (12), B (22), and C (32) are each hinged to rockers A (11), B (21), and C (31) respectively, to enable the solar panel (4) to rotate in both azimuth and elevation directions. Micro switches A (111), B (211), and C (311) are fixed on rotating arms A (12), B (22), and C (32) respectively. Axis A (131) is connected to bracket D (531) through bearing A (132) and is also fitted with axis B (231), within which axis C (331) is nested. One end of rotating arms A (12), B (22), and C (32) is fixedly connected to axis A (131), B (231), and C (331) respectively. Bevel gears A (13), B (23), and C (33) are each fixedly connected to axis A (131), B (231), and C (331) respectively (achieving continuous adjustment of the solar panel angle through worm gear, gear transmission, rocker, and rotating arm transmission). Axis G (151) is connected to the enclosure (53) through bearings and elastic stop ring D (152), and is also fitted with axis H (251), within which axis I (351) is nested. Bevel gears G (15), H (25), and I (35) are each fixedly connected to axis G (151), H (251), and I (351) respectively, and are engaged with bevel gears A (13), B (23), and C (33) respectively. Axis D (141) is connected to the enclosure (53) through bearing D (142) and bracket A (145). Axis D (141) is also fitted with axis E (241) within it. Axis E (241) is connected to bracket B (245) through bearing E (242). Axis E (241) is nested with axis F (341) inside, and axis F (341) is connected to bracket C (345) and the enclosure (53) through bearing F (342). Bevel gears D (14), E (24), and F (34) are each fixedly connected to axis D (141), E (241), and F (341) respectively, and are engaged with bevel gears A (13), B (23), and C (33) respectively. Worm gear A (143) is fixedly connected to axis D (141), worm gear B (243) is fixedly connected to axis E (241), and worm gear C (343) is fixedly connected to axis F (341). On worm gear A (146), axis M (1461) is connected to bracket F (562), bracket G (563), and the enclosure (53) through bearing G (172), and worm gear A (146) meshes with worm gear A (143); on worm gear B (246), axis N (2461) is connected to bracket F (562), bracket G (563), and the enclosure (53) through bearing H (272), and worm gear B (246) meshes with worm gear B (243); on worm gear C (346), axis O (3461) is connected to bracket E (561), bracket F (562), bracket G (563), and the enclosure (53) through bearing I (372), and worm gear C (346) meshes with worm gear C (343) (worm gear and worm structure with self-locking function). Gears A (147), B (247), and C (347) are each connected to worm gear A (146), worm gear B (246), and worm gear C (346) respectively through bearings. Drive component A (148) is fixedly connected to axis M (1461), drive component B (248) is fixedly connected to axis N (2461), and drive component C (348) is fixedly connected to axis O (3461). Slider A (1484) is fixedly connected to inclined plane slider A (1481) through double-ended threaded rod A (1482), and double-ended threaded rod A (1482) is fitted with reset spring D (1483). Transmission gear A (1485) is hinged to slider A (1484) (rotatable left and right by 5° to ensure meshing of gears). Slider B (2484) is fixedly connected to inclined plane slider B (2481) through double-ended threaded rod B (2482), and double-ended threaded rod B (2482) is fitted with reset spring E (2483). Transmission gear B (2485) is hinged to slider B (2484) (rotatable left and right by 5° to ensure meshing of gears). Slider C (3484) is fixedly connected to inclined plane slider C (3481) through double-ended threaded rod C (3482), and double-ended threaded rod C (3482) is fitted with reset spring F (3483). Transmission gear C (3485) is hinged to slider C (3484) (rotatable left and right by 5° to ensure meshing of gears). Slider A (1484) is located on the outer side of baffle E (1487), inclined plane slider A (1481) is located on the inner side of baffle E (1487), and one end of reset spring D (1483) contacts inclined plane slider A (1481), while the other end contacts the inner wall of baffle E (1487). Slider B (2484) is located on the outer side of baffle F (2487), inclined plane slider B (2481) is located on the inner side of baffle F (2487), and one end of reset spring E (2483) contacts inclined plane slider B (2481), while the other end contacts the inner wall of baffle F (2487). Slider C (3484) is located on the outer side of baffle G (3487), inclined plane slider C (3481) is located on the inner side of baffle G (3487), and one end of reset spring F (3483) contacts inclined plane slider C (3481), while the other end contacts the inner wall of baffle G (3487).

Transmission gear A (1485), transmission gear B (2485), and transmission gear C (3485) are in a disengaged state from internal gear A (1471), internal gear B (2471), and internal gear C (3471) respectively. Mobile sleeve A (17), mobile sleeve B (27), and mobile sleeve C (37) are each slidably connected to sleeve A (176), sleeve B (276), and sleeve C (376) respectively through D-shaped holes, and are fixedly connected to bracket G (563). One end of reset spring N (162), reset spring O (262), and reset spring P (362) is fixedly connected to sleeve A (176), sleeve B (276), and sleeve C (376) respectively, while the other end is fixedly connected to mobile sleeve A (17), mobile sleeve B (27), and mobile sleeve C (37) respectively. Mobile sleeve A (17), mobile sleeve B (27), and mobile sleeve C (37) each make contact with micro switch D (171), micro switch E (271), and micro switch F (371) respectively. Lever A (16), lever B (26), and lever C (36) are each slidably connected to shaft J (564), shaft K (565), and shaft L (566) respectively through D-shaped holes, and each of shaft J (564), shaft K (565), and shaft L (566) is fitted with reset spring A (161), reset spring B (261), and reset spring C (361) respectively. The hooks at the lower end of lever A (16), lever B (26), and lever C (36) are respectively connected to annular grooves A (173) on mobile sleeve A (17), annular grooves B (273) on mobile sleeve B (27), and annular grooves C (373) on mobile sleeve C (37). The pushrods of electromagnets A (163), B (263), and C (363) each make contact with one side of lever A (16), lever B (26), and lever C (36) respectively. The slide rail E (576) on the slider (57) is connected to the internal mobile groove of the enclosure (53), and one end of the slider (57) is equipped with reset spring G (575), the pushrod of electromagnet D (574) makes contact with one end of the slider (57). The triangular components D (577), E (578), and F (579) on the slider (57) each make sliding contact with triangular components A (174) on mobile sleeve A (17), triangular components B (274) on mobile sleeve B (27), and triangular components C (374) on mobile sleeve C (37). Gear A (147) meshes with gear B (247), gear B (247) meshes with gear C (347), and gear D (63) meshes with gear B (247). The rotor shaft of the motor (6) is fixedly connected to the sun gear (65), the planetary gear (651) meshes with the sun gear (65), and the planetary gear (651) is fitted with a planetary carrier (652), and the shaft M (6521) on the planetary carrier (652) is fixedly connected to gear D (63). The planetary gear (651) meshes with the external gear (64), forming a planetary gear system through the sun gear (65), planetary gear (651), external gear (64), and planetary carrier (652). The external gear (64) is equipped with ratchet A (641), ratchet B (642), and circular convex platform (643).

Micro switch G (644) and micro switch H (645) are located on both sides of the circular convex platform (643) with an angle of 5°. The external gear (64) is locked by the ratchet pawl. When the transmission structure is jammed, if there is no change in voltage difference among the three light-sensitive components within one second after the motor is powered on, the locking structure of the external gear (64) will be quickly released. At this point, the planetary gear carrier does not rotate due to the self-locking of the worm gear. The motor's drive causes the external gear (64) to rotate. When the circular convex platform (643) of the external gear (64) rotates and touches micro switch G (644) or micro switch H (645), it sends a signal to the control module (54), and the motor (6) is turned off. Pawl A (611) meshes with ratchet A (641) and is sleeved on shaft N (664) of bracket I (61). One end of reset spring H (6111) is fixedly connected to pawl A (611), and the other end is fixedly connected to stopper plate A (663). One side of inclined slider D (613) contacts the other side of pawl A (611), and the slide rail A (6132) on inclined slider D (613) is connected to the slide groove B (661) on bracket I (61). One side of reset spring I (6131) contacts the bottom end of inclined slider D (613), and the other side contacts bracket I (61). The inclined surface of inclined slider D (613) contacts the inclined surface of inclined slide board A (614), and the slide rail B (6141) on inclined slide board A (614) is connected to the slide groove A (66) on bracket I (61). One side of reset spring J (6142) is fixedly connected to one end of inclined slide board A (614), and the other side is fixedly connected to bracket I (61). The pushrod of electromagnet F (6143) contacts one end of the groove inside inclined slide board A (614), and the pushrod of electromagnet E (612) contacts the upper end of inclined slider D (613). Pawl B (621) meshes with ratchet B (642) and is sleeved on shaft O (674) of bracket J (62). One end of reset spring K (6211) is fixedly connected to pawl B (621), and the other end is fixedly connected to stopper plate D (673). One side of inclined slider E (623) contacts the other end of pawl B (621), and the slide rail D (6232) on inclined slider E (623) is connected to the slide groove D (671) on bracket J (62). One side of reset spring L (6231) contacts the bottom end of inclined slider E (623), and the other side contacts bracket J (62). The inclined surface of inclined slider E (623) contacts the inclined surface of inclined slide board B (624), and the slide rail C (6241) on inclined slide board B (624) is connected to the slide groove C (67) on bracket J (62). One side of reset spring M (6242) is fixedly connected to one end of inclined slide board B (624), and the other end is fixedly connected to bracket J (62). Electromagnet H (6243)'s push rod contacts one end of the recess on Inclined Slider B (624), and Electromagnet G (622)'s push rod contacts the upper end of Inclined Slider E (623). Bracket I (61), Bracket J (62), and the chassis (53) are fixedly connected. Fix the device on the ground, turn the power switch (58) to the ON position (582), power the device, Electromagnet A (163) is powered, driving Lever A (16) to move along the axis of Shaft J (564), driving the moving sleeve A (17) to move along the axis of Sleeve A (176), the moving sleeve A (17) pushes the Inclined Slider A (1481) along the radial extrusion of the driving member A (148), causing the Drive Tooth A (1485) to mesh with the Internal Gear A (1471); the triangular component A (174) on the moving sleeve A (17) squeezes the triangular component D (577) on the slide plate (57) to the left. When the slide plate (57) hits Microswitch I (59), the Drive Tooth A (1485) is fully extruded (transmitting the power of the motor to Worm A); the slide plate (57) returns to its original position under the action of the return spring G (575), contacting Microswitch J (591), the control module (54) receives the signal, and Electromagnet A (163) loses power; the motor (6) is powered, the motor (6) rotates forward, driving the Sun Gear (65) to rotate forward, the Sun Gear (65) drives the Planet Gear (651) to rotate in reverse, which in turn drives the Planet Carrier (652) to rotate forward. Gear D (63) rotates forward, driving Gear B (247) to rotate in reverse, which drives Gear A (147) to rotate forward. Gear A (147) drives Drive Tooth A (1485) to rotate forward, which in turn drives Drive Component A (148) to rotate forward. Drive Component A (148) drives Worm A (146) to rotate forward, which drives Worm Gear A (143) to rotate forward. Worm Gear A (143) drives Bevel Gear D (14) to rotate forward, which drives Bevel Gear A (13) to rotate in reverse. Bevel Gear A (13) drives Arm A (12) to rotate in reverse, causing Lever A (11) to descend, adjusting the angle between the solar panel mount (41) and the ground. When Lever A (11) touches Microswitch A (111), Lever B (21) touches Microswitch K (213), and Lever C (31) touches Microswitch L (313), the control module (54) receives the signal, and the motor (6) stops (on one hand, it drives the solar panel to move to the predetermined position, on the other hand, it checks if there is any malfunction in the device); Electromagnet D (574) is powered, pushing the slide plate (57) to the left. When Triangle Component D (577) separates from Triangle Component A (174), the moving sleeve A (17) returns to its original position under the action of return spring N (162) and contacts Microswitch D (171). Lever A (16) returns to its original position under the action of return spring A (161), and Drive Tooth A (1485), Slider A (1484), and Inclined Slider A (1481) return to their original positions under the action of return spring D (1483). Electromagnet D (574) loses power, and the slide plate returns to its original position under the action of return spring G (575). When the slide plate (57) contacts Microswitch J (591), the motor (6) is powered in reverse for 0.1 second to ensure that Drive Tooth A (1485) disengages from Internal Gear A (1471) (the operation and stop process of Lever B (21) and Lever C (31) are similar to that of Lever A (11)).

The control module continuously monitors the voltage values of Photosensitive Element A (1), Photosensitive Element B (2), and Photosensitive Element C (3). When the sun rises, the voltage values of Photosensitive Element A (1), Photosensitive Element B (2), and Photosensitive Element C (3) differ due to variations in light intensity. When the voltage difference between any two of the three photosensitive elements exceeds a predefined threshold value (if the voltage difference between any two of the three elements exceeds the system's predefined threshold value), the control module (54) sends a signal. The lever corresponding to the maximum voltage difference will change first, i.e., the corresponding electromagnet is powered, causing the corresponding drive tooth to engage with the internal gear (transferring the power of the motor to the worm). The corresponding lever is then raised or lowered through the transmission of gears, worm gears, and bevel gears to reduce the voltage difference. When the voltage difference of that photosensitive element is less than the predefined threshold value, the adjustment ends. The control module then rechecks the voltage differences between Photosensitive Element A (1), Photosensitive Element B (2), and Photosensitive Element C (3). If any voltage difference exceeds the predefined threshold value, the one with the highest voltage difference is selected again, and the device adjusts its orientation accordingly. This process repeats until all voltage differences between any two elements are less than the predefined threshold value. When all voltage differences between any two elements are less than the predefined threshold value, it is considered that the device has adjusted to the required position. At this point, the solar panel is approximately perpendicular to the sunlight, and the solar panel receives the maximum approximate flux of sunlight.

When the sun sets, and the voltage difference between the three photosensitive elements remains unchanged for a long period (system-defined as 30 minutes, indicating the sun has set), the control module (54) sends a signal. Electromagnet A (163) is powered, causing Lever A (16) to move along with the Mobile Sleeve A (17), engaging the Drive Tooth A (1485) with the Internal Gear A (1471) (transferring the motor's power to Worm A (146)). The motor is powered, driving Lever A (11) to rise or fall through the transmission of gears, worm gears, and bevel gears. When Lever A (11) touches Microswitch A (111), the motor stops. The operation and stop process of Lever B (21) and Lever C (31) are similar to that of Lever A (11), with Lever B (21) and Lever C (31) contacting Microswitch K (213) and Microswitch L (313), respectively. At this point, the solar panel fixture (41) returns to its initial position, preparing for the next day's operation.

The device utilizes a mechanism with a self-locking function using a worm gear system to achieve self-locking (to prevent wind loads from affecting the orientation of the solar panel). In the event of a malfunction (such as the worm gear system or lever getting damaged or stuck, causing gears A (147), B (247), C (347), D (63), and the planetary frame (652) to fail to operate), when the motor is powered, if there is no change in the voltage difference between Photosensitive Element A (1), Photosensitive Element B (2), and Photosensitive Element C (3) within one second, the control module will send a signal. This signal causes Pawl A (641), Pawl A (611), Pawl B (642), and Pawl B (621) to disengage simultaneously (Electromagnet E (612) is powered, pushing down the Inclined Slider D (613), which moves the Inclined Slider A (614) radially. When the inclined surface of Inclined Slider D (613) separates from the inclined surface of Inclined Slider A (614), Inclined Slider A (614) returns to its original position under the action of Reset Spring J (6142), and Electromagnet E (612) loses power, causing Pawl A (641) and Pawl A (611) to disengage. Electromagnet G (622) is powered, pushing down Inclined Slider E (623), which moves Inclined Slider B (624) radially. When the inclined surface of Inclined Slider E (623) separates from the inclined surface of Inclined Slider B (624), Inclined Slider B (624) returns to its original position under the action of Reset Spring M (6242), and Electromagnet G (622) loses power, causing Pawl B (642) and Pawl B (621) to disengage). At this point, the locking of the external gear (64) is released. Under the drive of the motor (6) rotor shaft through the planetary gear system, the external gear (64) rotates. When the arc boss (643) on the external gear (64) contacts Microswitch G (644) or Microswitch H (645), the device alarms, the alarm light (52) flashes, the motor (6) is powered off, and the device stops running to ensure safety.

The technical means disclosed in the solution of the present invention are not limited to the technical means disclosed in the above embodiments, but also include technical solutions composed of any combination of the above technical features. It should be noted that for those of ordinary skill in the art, several improvements and modifications can be made without departing from the principles of the present invention, and these improvements and modifications are also regarded as the protection scope of the present invention.

What is claimed is:
1. A photovoltaic power generation device for automatically tracking the sun, comprising:
   a box body (53), wherein the box body (53) is internally equipped with interconnected a worm gear and worm component and a gear transmission component;
   a continuously adjustable component, wherein the continuously adjustable component is connected to the worm gear and worm component; and
   a solar panel (4), wherein the solar panel (4) is arranged above the box body (53), and the bottom of the solar panel (4) is connected to the continuously adjustable component;
   wherein the continuously adjustable component comprises:
      three solar fixed plates (41), fixed to the bottom of the solar panel (4) along a circumferential direction;
      D-shaped shafts A (112), B (212), and C (312);
      rocking arms A (11), B (21), and C (31), wherein upper ends of the rocking arms A (11), B (21), and C (31) are respectively connected to the three solar fixed plates (41) through the D-shaped shafts A (112), B (212), and C (312);
      rotating arms A (12), B (22), and C (32), wherein upper ends of the rotating arms A (12), B (22), and C (32) are respectively hinged to lower ends of the rocking arms A (11), B (21), and C (31);
      shafts A (13), B (231), and C (331), wherein the shafts A (131), B (231), and C (331) are respectively fixedly connected to lower ends of the rotating arms A (12), B (22), and C (32);
      bearings A (132), B (232) and C (332), wherein the shaft A (131) internally houses the shaft B (231) installed through the bearing B (232), and the shaft C (331) is installed through the bearing C (332) within the shaft B (231);
      a bracket D (531), wherein the bracket D (531) is connected to the shaft A (131) via the bearing A (132); and bevel gears A (13), B (23), and C (33), respectively fixed at lower ends of the shafts (131), B (231), and C (331).

2. The photovoltaic power generation device for automatically tracking the sun as claimed in claim 1, wherein the worm gear and worm component comprises:

axles G (151) and D (14), wherein the axles G (151) and D (141) are transversely arranged and share a central axis, and the axle G (151) is connected to the box body (53) via the bearings A (132), B (232), and C (332);

an axle E (241), wherein the axle E (241) is disposed in the axle D (141);

an axle F (341), wherein the axle F (341) is disposed in the axle E (241);

an axle H (251), wherein the axle H (251) is disposed in the axle G (151);

an axle I (351), wherein the axle I (351) is disposed in the axle H (251);

elastic retaining rings D (152), wherein the elastic retaining rings D (152) are connected to the axle G (151);

bevel gears D (14), E (24), and F (34), wherein the bevel gears D (14), E (24), and F (34) respectively engage with the bevel gears A (13), B (23), and C (33); and the axles D (141), E (241), and F (341) are respectively fixedly connected to the bevel gears D (14), E (24), and F (34);

bevel gears G (15), H (25), and I (35), wherein the bevel gears G (15), H (25), and I (35) respectively engage with the bevel gears A (13), B (23), and C, (33); and the axles G (151), H (251), and I (351) are respectively fixedly connected to the bevel gears G (15), H (25), and I (35);

elastic retaining rings E (252) and F (352), wherein ends of the axles H (251) and I (351) are respectively provided with the elastic retaining rings E (252) and F (352);

bearings D (142), E (242), F (342), G (172), H (272), and I (372);

brackets A (145), B (245), C (345), F (562) and G (563), wherein the axle D (141) is connected to the bracket A (145) via the bearing D (142), the axle B (241) is connected to the bracket B (245) via the bearing E (242), and the axle F (341) is connected to the bracket @ (345) via the bearing F (342);

a worm A (143), wherein the worm A (143) is fixedly connected to the axle D (141);

a worm B (243), wherein the worm B (243) is fixedly connected to the axle E (241);

a worm C (343), wherein the worm C (343) is fixedly connected to the axle F (341);

elastic retaining rings A (144), B (244), and C (344), wherein the elastic retaining rings A (144), B (244), and C (344) are disposed in the worms, A (143), B (243), and C (343), respectively;

a worm shaft A (146), wherein the worm shaft A (146) is provided with a shaft M (1461) thereon, the shaft M (1461) on the worm shaft A (146) is connected to the brackets F (562) and G (563), the box body (53) via the bearing G (172), and the worm shaft A (146) meshes with the worm A (143);

a worm shaft B (246), wherein the worm shaft B (246) is provided with a shaft N (2461) thereon, the shaft N (2461) on the worm shaft B (246) is connected to the brackets F (562) and G (563), and the box body (53) via the bearing H (272), and the worm shaft B (246) meshes with the worm B (243); and a worm shaft C (346), wherein the worm shaft C (346) is provided with a shaft O (3461) thereon, the shaft O (3461) on the worm shaft C (346) is connected to the brackets E (561), F (562), and G (563), and the box body (53) via the bearing I (372), and the worm shaft C (346) meshes with the worm C (343).

3. The photovoltaic power generation device for automatically tracking the sun as claimed in claim 2, wherein the gear transmission component comprises:

gears A (147), B (247), and C (347), wherein the gears A (147), B (247), and C (347) are respectively connected to the worm shafts A (146), B (246), and C (346) via the bearings A (132), B (232), and C (332);

driving members A (148), B (248) and C (348), disposed in the box body (53); wherein the driving members A (148), B (248), and C (348) respectively define annular grooves A (1486), B (2486), and C (3486); and the driving member A (148) is fixedly connected to the shaft M (1461), the driving member B (248) is fixedly connected to the shaft N (2461), and the driving member C (348) is fixedly connected to the shaft O (3461);

a slider A (1484), a slider B (2484) and a slider C (3484);

an inclined slider A (1481), an inclined slider B (2481) and an inclined slider C (3481);

a double-headed threaded rod A (1482), a double-headed threaded rod B (2482), and a double-headed threaded rod C (3482), wherein the slider A (1484) is fixedly connected to the inclined slider A (1481) via the double-headed threaded rod A (1482), the slider B (2484) is fixedly connected to the inclined slider B (2481) via the double-headed threaded rod B (2482), and the slider C (3484) is fixedly connected to the inclined slider C (3481) via the double-headed threaded rod C (3482);

a reset spring D (1483), a reset spring E (2483), and a reset spring F (3483), wherein the double-headed threaded rod A (1482) is sleeved with the reset spring D (1483), the double-headed threaded rod B (2482) is sleeved with the reset spring E (2483), and the double-headed threaded rod C (3482) is sleeved with the reset spring F (3483); and a driving tooth A (1485), a driving tooth B (2485), and a driving tooth C (3485), disposed on the driving members A (148), B (248), and C (348), respectively; wherein the driving tooth A (1485) is hinged with the slider A (1484), the driving tooth B (2485) is hinged with the slider B (2484), and the driving tooth C (3485) is hinged with the slider C (3484).

4. The photovoltaic power generation device for automatically tracking the sun as claimed in claim 3, wherein the gear transmission component further comprises:

a baffle E (1487), wherein the slider A (1484) is located on an outer side of the baffle E (1487), the inclined slider A (1481) is located on an inner side of the baffle E (1487), an end of the reset spring D (1483) contacts with the inclined slider A (1481), and the other end of the reset spring D (1483) contacts with the inner wall of baffle E (1487);

a baffle F (2487), wherein the slider B (2484) is located on an outer side of the baffle F (2487), the inclined slider B (2481) is located on an inner side of baffle F (2487), an end of the reset spring E (2483) contacts with the inclined slider B (2481), and the other end of the reset spring F (2483) contacts with the inner wall of the baffle F (2487); and a baffle G (3487), wherein the slider C (3484) is located on an outer side of the baffle G (3487), the inclined slider C (3481) is located on an inner side of the baffle G (3487), an end of the reset spring F (3483) contacts with the inclined slider C (3481), and the other end of the reset spring F (3483) contacts with the inner wall of the baffle G (3487).

5. The photovoltaic power generation device for automatically tracking the sun as claimed in claim 2, wherein the gear transmission component further comprises;

an internal gear ring A (1471), an internal gear ring B (2471), and an internal gear ring C (3471), wherein the driving tooth A (1485), the driving tooth B (2485), and the driving tooth C (3485) are respectively matched with the internal gear ring A (1471), the internal gear ring B (2471), and the internal gear ring C (3471);

sleeves A (176), B (276), and C (376), wherein the sleeves A (176), B (276), and C (376) are fixedly connected to the bracket G (563);

moving sleeves A (17), B (27), and C (37), wherein the moving sleeves A (17), B (27), and C (37) are respectively slidably connected to the sleeves A (176), B (276), and C (376) via D-shaped holes;

reset springs N (162), O (262), and P (362), wherein ends of the reset springs N (162), O (262), and P (362) are respectively fixedly connected to the sleeves A (176), B (276), and C (376), and another ends of the reset springs N (162), O (262), and P (362) are respectively fixedly connected to the moving sleeves A (17), B (27), and C (37);

microswitches D (17), B (271), and F (371), wherein the moving sleeves A (17), B (27), and C (37) respectively contact the microswitches D (171), E (271), and F (371);

levers A (16), B (26), and C (36), wherein lower ends of the levers A (16), B (26), and C (36) are respectively connected to a circular groove A (173) defined on the moving sleeve A (17), a circular groove B (273) defined on the moving sleeve B (27), and a circular groove C (373) defined on the moving sleeve C (37);

shafts J (564), K (565), and L (566), wherein the levers A (16), B (26) and C (36) are respectively slidably connected to the shafts J (564), K (565), and L (566) via D-shaped holes;

reset springs A (161), B (261), and C (361), wherein the shafts J (564), K (565), and L (566) are respectively sleeved with the reset springs A (161), B (261), and C (361);

electromagnets A (163), B (263), and C (363), wherein the electromagnets A (163), B (263), and C (363) are respectively provided with push rods, and the push rods of the electromagnets A (163), B (263), and C (363) respectively contact sides of the levers A (16), B (26), and C (36);

a slide plate (57) and a slide rail E (576) disposed on the slide plate (57), wherein the slide rail E (576) is connected to a movable groove inside the box body (53);

a reset spring G (575), wherein the reset spring G (575) is disposed at an end of the slide plate (57);

an electromagnet D (574), wherein the electromagnet D (574) is provided with a push rod thereon, and the push rod of the electromagnet D (574) contacts the end of the slide plate (57);

triangular components A (174), B (274), and C (374), wherein the triangular components A (174), B (274) and C (374) are disposed on the moving sleeves A (17), B (27), and C (37), respectively;

triangular components D (577), E (578), and F (579), wherein the triangular components D (577), E (578), and F (579) are disposed on the slide plate (57) and respectively contact the triangular component A (174) on the moving sleeve A (17), the triangular component B (274) on the moving sleeve B (27), and the triangular component C (374) on the moving sleeve C (37) via triangular sliding surfaces;

microswitches I (59) and J (591) wherein the microswitches I (59) and J (591) are respectively disposed at two ends of the slide plate (57);

a gear D (63), wherein the gear A (147) meshes with the gear B (247), the gear B (247) meshes with the gear C (347), and the gear D (63) meshes with the gear B (247);

a bracket H (567);

a motor (6), wherein the motor (6) is mounted on the bracket H (567) and the motor (6) comprises a rotor shaft;

a sun gear (65), wherein the rotor shaft of the motor (6) is fixedly connected to the sun gear (65);

a planet gear (651), wherein the planet gear (651) meshes with the sun gear (65);

a planet carrier (652), wherein the planet gear (651) is sleeved with the planet carrier (652), a shaft M (6521) on the planet carrier (652) is fixedly connected to the gear D (63);

an external gear ring (64), wherein the planet gear (651) meshes with the external gear ring (64), and the external gear ring (64) is provided with pawls A (641), pawls B (642), and an arc convex platform (643); and microswitches G (644) and H (645), wherein the microswitches G (644) and H (645) are distributed on two sides of the arc convex platform (643).

6. The photovoltaic power generation device for automatically tracking the sun as claimed in claim 5, wherein the gear transmission component further comprises:

a claw A (611), a ratchet A (641), wherein the claw A (611) meshes with the ratchet A (641);

a bracket I (61), wherein the bracket I (61) is provided with a shaft N (664), the claw A (611) is mounted on the shaft N (664) of the bracket I (61), and the bracket I (61) is fixed to the box body (53);

a baffle B (663) and a baffle D (673);

a return spring H (6111), wherein an end of the return spring H (6111) is fixed to the claw A (611), and another end of the return spring H (6111) is fixed to the baffle B (663);

an inclined slider D (613), wherein a side of the inclined slider D (613) contacts a side of the claw A (611); and a slope of the inclined slider D (613) contacts a slope of the inclined slider A (614);

a rail A (6132), wherein the rail A (6132) is disposed on the inclined slider D (613) and the rail A (6132) on the inclined slider D (613) is connected to a groove B (661) on the bracket I (61);

a return spring I (6131), wherein an end of the return spring I (6131) contacts a bottom of the inclined slider D (613), and the other end of the return spring I (6131) contacts the bracket I (61);

a rail B (6141), wherein the rail B (6141) is disposed on the inclined slider A (614), and the rail B (6141) on the inclined slider A (614) is connected to a groove A (66) on the bracket I (61);

a return spring J (6142), wherein an end of the return spring J (6142) is fixed to an end of the inclined slider A (614), and the other end of the return spring J (6142) is fixed to the bracket I (61);

an electromagnet F (6143) and an electromagnet E (612), wherein the electromagnet F (6143) is provided with a push rod, and the push rod of the electromagnet F (6143) contacts an end of a groove in the inclined slider A (614); and the electromagnet E (612) is provided with a push rod, and the push rod of the electromagnet E (612) contacts an upper end of the inclined slider D (613);

a claw B (621), a ratchet B (642), wherein the claw B (621) meshes with the ratchet B (642);

a bracket J (62), wherein the bracket J (62) is provided with a shaft O (674), the claw B (621) is mounted on the shaft O (674) of one end of the bracket J (6), and the bracket J (62) is fixed to the box body (53);

a return spring K (6211), wherein an end of the return spring K (6211) is fixed to the claw B (621), and the other end of the return spring K (6211) is fixed to the baffle D (673);

an inclined slider E (623), wherein a side of the inclined slider E (623) contacts the other end of the claw B (621); and a slope of the inclined slider E (623) contacts a slope of the inclined slider B (624);

a rail D (6232), wherein the rail D (6232) is disposed on the inclined slider E (623), and the rail D (6232) on the inclined slider E (623) is connected to a groove D (671) on the bracket J (62);

a return spring L (6231), wherein an end of the return spring I, (6231) contacts a bottom of the inclined slider E (623), and the other end of the return spring L (6231) contacts the bracket J (62);

a rail C (6241), wherein the rail C (6241) is disposed on the inclined slider B (624), and the rail C (6241) on the inclined slider B (624) is connected to a groove C (67) on the bracket J (62);

a return spring M (6242); wherein an end of the return spring M (6242) is fixed to an end of the inclined slider B (624), and the other end of the return spring M (6242) is fixed to the bracket J (62);

an electromagnet H (6243), wherein the electromagnet H (6243) is provided with a push rod, and the push rod of the electromagnet H (6243) contacts an end of a groove in the inclined slider B (624); and an electromagnet G (622), wherein the electromagnet G (622) is provided with a push rod, and the push rod of the electromagnet G (622) contacts an upper end of the inclined slider E (623).

7. The photovoltaic power generation device for automatically tracking the sun as claimed in claim 1, wherein structures of the D-shaped shafts A (112), B (212), and C (312) are the same, all of which are cylindrical structures with symmetrical ends and D-shaped cross-sections;

wherein one end of the D-shaped shaft A (112) is fixedly connected to the solar panel (41), and the other end the D-shaped shaft A (112) is equipped with a photosensitive element A (1), with a middle part hinged to the upper end of rocking arm A (11);

wherein one end of the D-shaped shaft B (212) is fixedly connected to the solar panel (41), and the other end of the D-shaped shaft B (212) is equipped with a photosensitive element B (2), with a middle part hinged to the upper end of the rocking arm B (21);

wherein one end of the D-shaped shaft C (312) is fixedly connected to the solar panel (41), and the other end of the D-shaped shaft C (312) is equipped with a photosensitive element C (3), with a middle part hinged to the upper end of the rocking arm C (31); the photosensitive elements A (1), B (2), and C (3) are distributed at 120° intervals.

8. The photovoltaic power generation device for automatically tracking the sun as claimed in claim 7, wherein the continuously adjustable component comprises:

microswitches A (111), B (211), and C (311), wherein the microswitches A (111), B (211), and C (311) are respectively fixed on the rocking arms A (12), B (22), and C (32); and microswitches K (213) and L (313), wherein the microswitches K (213) and L (313) are respectively provided on the rocking arms B (21) and C (31).

9. The photovoltaic power generation device for automatically tracking the sun as claimed in claim 1, further comprising:

a cover (5), wherein the cover (5) is disposed on a top of the box body (53);

a handle (51), wherein the handle (51) is disposed at a middle of a top surface of the cover (5);

alarm lights (52), wherein the alarm lights (52) are disposed at two corners of the cover (5);

a control module (54) and a battery (55), wherein the control module (54) and the battery (55) are disposed inside the box body (53); and a power switch (58), wherein the power switch (58) is disposed a side of the box body (53), and the power switch (58) comprises: an OFF position (581) and an ON position (582) at two ends of the power switch (58).

\* \* \* \* \*